United States Patent
Binfet et al.

(10) Patent No.: US 12,189,949 B2
(45) Date of Patent: Jan. 7, 2025

(54) BIT ERROR MANAGEMENT IN MEMORY DEVICES

(71) Applicant: Micron Technology, Inc., Boise, ID (US)

(72) Inventors: Jeremy Binfet, Boise, ID (US); Tommaso Vali, Sezze (IT); Walter Di Francesco, Avezzano (IT); Luigi Pilolli, L'Aquila (IT); Angelo Covello, Avezzano (IT); Andrea D'Alessandro, Avezzano (IT); Agostino Macerola, San Benedetto dei Marsi (IT); Cristina Lattaro, Rieti (IT); Claudia Ciaschi, Latina (IT)

(73) Assignee: Micron Technology, Inc., Boise, ID (US)

( * ) Notice: Subject to any disclaimer, the term of this patent is extended or adjusted under 35 U.S.C. 154(b) by 39 days.

(21) Appl. No.: 18/049,121

(22) Filed: Oct. 24, 2022

(65) Prior Publication Data
US 2023/0393739 A1 Dec. 7, 2023

Related U.S. Application Data

(60) Provisional application No. 63/365,680, filed on Jun. 1, 2022.

(51) Int. Cl.
*G06F 3/06* (2006.01)

(52) U.S. Cl.
CPC ............ *G06F 3/061* (2013.01); *G06F 3/0622* (2013.01); *G06F 3/0659* (2013.01); *G06F 3/0679* (2013.01)

(58) Field of Classification Search
CPC ...... G06F 12/06; G06F 3/0656; G06F 3/0659; G06F 3/061; G06F 3/0622; G06F 3/0679; G06F 3/0614; G06F 3/06; G06F 12/0246
See application file for complete search history.

(56) References Cited

U.S. PATENT DOCUMENTS

| | | | | |
|---|---|---|---|---|
| 5,410,545 | A * | 4/1995 | Porter | G06F 11/1044 714/E11.041 |
| 9,419,737 | B2 * | 8/2016 | Fredriksson | H04J 3/0658 |
| 11,036,581 | B2 * | 6/2021 | Chen | G06F 11/1048 |
| 2007/0266300 | A1 * | 11/2007 | Ito | H03M 13/293 714/770 |

(Continued)

FOREIGN PATENT DOCUMENTS

| | | | | |
|---|---|---|---|---|
| EP | 3849145 A2 * | 7/2021 | | H04J 3/0614 |
| WO | WO-2020148746 A1 * | 7/2020 | | H04L 12/40 |

OTHER PUBLICATIONS

Joe Brewer; Manzur Gill, "Embedded Flash Memory," in Nonvolatile Memory Technologies with Emphasis on Flash: A Comprehensive Guide to Understanding and Using Flash Memory Devices, IEEE, 2008, pp. 373-405.ch9.*

(Continued)

*Primary Examiner* — Pierre Michel Bataille
(74) *Attorney, Agent, or Firm* — Harrity & Harrity, LLP

(57) ABSTRACT

In some implementations, a memory device may receive a command to read data in a first format from non-volatile memory, the data being stored in a second format in the non-volatile memory, the second format comprising a plurality of copies of the data in the first format. The memory device may compare, using an error correction circuit, the plurality of copies of the data to determine a dominant bit state for bits of the data. The memory device may store the dominant bit state for bits of the data in the non-volatile memory as error-corrected data in the first format. The memory device may cause the error-corrected data to be read from the non-volatile memory in the first format as a response to the command to read the data in the first format.

25 Claims, 17 Drawing Sheets

(56) References Cited

U.S. PATENT DOCUMENTS

| | | | |
|---|---|---|---|
| 2015/0095693 A1* | 4/2015 | Chinnakkonda Vidyapoornachary | ........................ G06F 11/1666 714/6.23 |
| 2016/0125951 A1* | 5/2016 | Sun | ........................ G11C 29/028 365/185.24 |
| 2018/0039538 A1* | 2/2018 | Freikorn | ............. G06F 11/1048 |
| 2021/0042188 A1* | 2/2021 | Chen | ................... G06F 11/1068 |
| 2022/0046114 A1* | 2/2022 | Entelis | .................... H04L 12/40 |
| 2022/0413762 A1* | 12/2022 | Pletka | ................. G06F 12/0246 |

OTHER PUBLICATIONS

Amy Tai et al, "Live Recovery of Bit Corruptions in Datacenter Storage Systems," Princeton University, Facebook Inc, Stanford University and Barracuda Networks, May 2018.*

A. Jadidi, M. Arjomand, M. K. Tavana, D. R. Kaeli, M. T. Kandemir and C. R. Das, "Exploring the Potential for Collaborative Data Compression and Hard-Error Tolerance in PCM Memories," 2017 47th Annual IEEE/IFIP International Conference on Dependable Systems and Networks (DSN), Denver, CO, USA, 2017, pp. 85-96.*

R. Micheloni, M. Picca, S. Amato, H. Schwalm, M. Scheppler and S. Commodaro, "Non-Volatile Memories for Removable Media," in Proceedings of the IEEE, vol. 97, No. 1, pp. 148-160, Jan. 2009.*

W. Wei, K. Namba, Y. -B. Kim and F. Lombardi, "A Novel Scheme for Tolerating Single Event/Multiple Bit Upsets (SEU/MBU) in Non-Volatile Memories," in IEEE Transactions on Computers, vol. 65, No. 3, pp. 781-790, Mar. 1, 2016.*

Y. Cai et al., "Flash correct-and-refresh: Retention-aware error management for increased flash memory lifetime," 2012 IEEE 30th International Conference on Computer Design (ICCD), Montreal, QC, Canada, 2012, pp. 94-101.*

\* cited by examiner

700 ⟶

Partial Adder

710 ⟶

Full Adder

BIT ERROR MANAGEMENT IN MEMORY DEVICES

CROSS-REFERENCE TO RELATED APPLICATION

This patent application claims priority to U.S. Provisional Patent Application No. 63/365,680, filed on Jun. 1, 2022, and entitled "BIT ERROR MANAGEMENT IN MEMORY DEVICES." The disclosure of the prior application is considered part of and is incorporated by reference into this patent application.

TECHNICAL FIELD

The present disclosure generally relates to memory devices and, for example, to bit error management in memory devices.

BACKGROUND

NAND flash memory, which may also be referred to as a "NAND" or a "NAND memory device," is a non-volatile type of memory device that uses circuitry similar to or resembling NAND logic gates to enable electrically programming, erasing, and storing of data even when a power source is not supplied. NANDs may be used in various types of electronic devices, such as computers, mobile phones, or automobile computing systems, among other examples.

A NAND memory device may include an array of flash memory cells, a page buffer, and a column decoder. In addition, the NAND memory device may include a control logic unit (e.g., a controller), a row decoder, or an address buffer, among other examples. The memory cell array may include memory cell strings connected to bit lines, which are extended in a column direction.

A flash memory cell, which may be referred to as a "cell" or a "data cell," of a NAND memory device may include a current path formed between a source and a drain on a semiconductor substrate. The flash memory cell may further include a floating gate and a control gate formed between insulating layers on the semiconductor substrate. A programming operation (sometimes called a write operation) of the flash memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the flash memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the flash memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A memory device may include a plurality of page buffers connected between the bit lines and the column decoder. The column decoder is connected between the page buffer and data lines.

DETAILED DESCRIPTION

Figure 1:
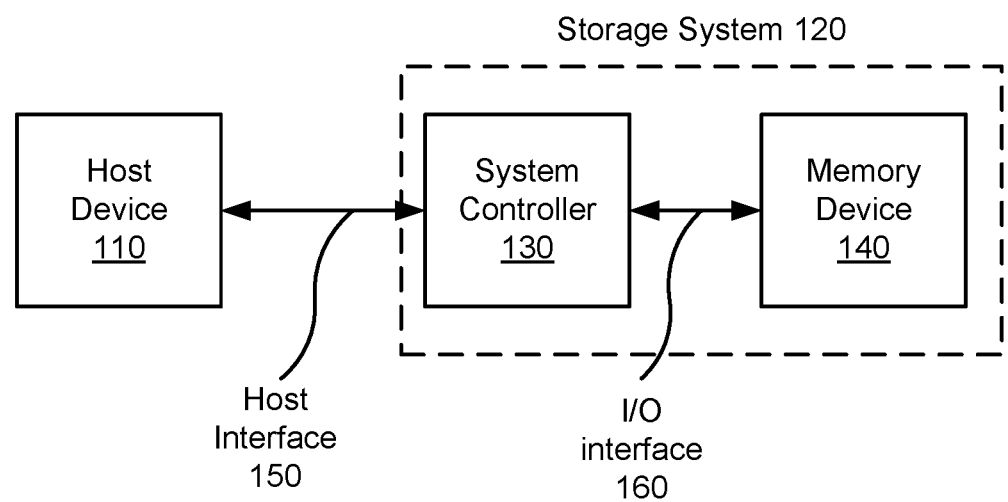
FIG. 1 is a diagram illustrating an example system capable of bit error management.

Data that is stored in a storage system may be subject to bit errors. For example, memory devices, such as NAND memory devices or other non-volatile memory devices, may develop bit errors on data stored thereon over time as a result of manufacturer defects, degradation of components, program errors, or read errors, among other examples. An error correcting code (ECC) may be used with a memory device (e.g., a NAND memory device) to detect and correct bit errors that may occur with a memory of the memory device. Providing ECC may increase a reliability of data that is read from a memory device. This may increase a longevity of the memory device by reducing a need to replace memory devices as components thereof degrade and data storage becomes less reliable. Different ECC algorithms include Bose-Chaudhuri-Hocquenghem (BCH) codes, Hamming codes, or Reed-Solomon codes, among other examples.

One limitation of ECC algorithms is that such algorithms may require system firmware to be loaded for the algorithms to be run. As a result, error correction may not be available before system firmware load, such as during chip initialization and for security operations. Further, for security operations, it may be desirable to avoid exporting data off of a memory device to another device for error correction. For example, when data is offloaded for error correction, the transfer of data may enable a malicious entity to intercept and utilize the data. Accordingly, to provide error correction, the memory device may have an on-chip error correction circuit, such as a BCH-type error correction circuit, which is provided on a die of the memory device as a component that is separate from the memory device (e.g., as part of a system controller that communicates with the memory device and/or as part of a storage system that includes the memory device). However, a BCH-type error correction circuit may use an excessive amount of silicon space on the die and/or result in excessive cost for manufacture.

Some implementations described herein enable use of an error correction circuit (e.g., a bit majority circuit) for error correction in a memory device, such as a NAND memory device or another type of memory device (e.g., a non-volatile memory device, a NOR device, or the like). Using implementations described herein, the memory device can provide an interface for receiving data, storing the data, and recalling the data with error correction provided within the memory device, rather than having error correction occur off of the memory device. In this way, the memory device achieves a higher level of security than is achieved by other devices that offload error correction. Moreover, some implementations described herein provide an interface for programming (e.g., writing) data and reading data that is transparent to another device that is using the memory device as a storage system. In this way, the memory device can store and provide error corrected data to another device without the other device having to specially format the data for error correction to occur, which provides greater deployment flexibility. Additionally, or alternatively, the use of an error correction circuit for error correction enables on-chip error correction with a reduced use of die area than is achieved by other types of error correction circuits. In some implementations, the error correction circuit may include an inversion block, which enables an improved probabilistic distribution of randomized bits on erased sections of the memory device and detection of attempts to read erased data.

FIG. 1 is a diagram illustrating an example system 100 capable of bit error management. The system 100 may include one or more devices, apparatuses, and/or components for performing operations described herein (e.g., for bit error management). For example, the system 100 may include a host device 110 and a storage system 120. The storage system 120 may include a system controller 130 and a memory device 140. The host device 110 may communicate with the storage system 120 (e.g., the system controller 130 of the storage system 120) via a host interface 150. The system controller 130 and the memory device 140 may communicate via an input/output (I/O) interface 150.

The system 100 may be any electronic device configured to store data in memory. For example, the system 100 may be a computer, a mobile phone, a wired or wireless communication device, a network device, a server, and/or an Internet of Things (IoT) device. The host device 110 may include one or more processors configured to execute instructions and store data in the memory device 140. For example, the host device 110 may include a central processing unit (CPU), a graphics processing unit (GPU), a field-programmable gate array (FPGA), an application-specific integrated circuit (ASIC), and/or a controller.

The storage system 120 may be any electronic device configured to store data in memory. In some implementations, the storage system 120 may be an electronic device configured to store data persistently in non-volatile memory. For example, the storage system 120 may be a hard drive, a solid-state drive (SSD), a flash memory device (e.g., a NAND flash device), a universal serial bus (USB) thumb drive, a memory card (e.g., a secure digital (SD) card), a secondary storage device, and/or an embedded multimedia card (eMMC) device.

The system controller 130 may be any device configured to communicate with the host device (e.g., via the host interface 150) and the memory device 140 (e.g., via the I/O interface 160) and/or configured to control operations of the storage system 120. For example, the system controller 130 may include an ASIC, an FPGA, a processor, and/or a controller.

The memory device 140 may be a non-volatile memory device configured to maintain data stored in memory after the memory device 140 is powered off (e.g., configured for persistent data storage). In some implementations, the memory device 140 is a NAND memory device. Although some techniques are described herein in connection with NAND memory devices, in some implementations, one or more of these techniques may be performed in connection with other types of non-volatile memory devices, such as NOR memory devices, among other examples.

The system controller 130 may transmit a command to the memory device 140 based on an instruction received from the host device 110. The command may be, for example, a read command, a write command (sometimes called a program command), or an erase command. Additionally, or alternatively, the command may indicate the data to be read, written, or erased, and/or may indicate a location (e.g., in memory) for the data to be read, written, or erased. The data, the location for the data, and/or the command can, in some implementations, form a first format for the data. For example, when memory device 140 receives, from the system controller 130, a command to store data at a particular memory location, the memory device 140 can be said to have received the data in a first format.

In some implementations, the memory device 140 may execute the command in an error-free block. The error free block, as described in more detail herein, may include one or more portions of the memory device 140 for which an error correction circuit is used to perform on-chip error correction and provide pre-error-corrected data. For example, the memory device 140 may receive a write command identifying a first location (e.g., 1 kilobyte (kB) of bit space) for storing data within the error-free block. In this case, the memory device 140 may change a format of the data by, for example, generating multiple, redundant copies of the data (e.g., 8 or 16 copies) and storing the multiple, redundant copies of the data in the error-free block at a second location within the error-free block (e.g., the second location may be 8 or 16 kB of bit space to store the 8 or 16 copies of the data). The multiple, redundant copies of the data stored in the second location may, in some implementations, form a second format for the data.

When the memory device 140 receives a subsequent read command (e.g., identifying the first location at which the data was to be stored), the memory device may read the multiple, redundant copies of the data from the second location and use an error correction circuit to determine a dominant state of each bit of the data. In this case, the memory device 140 fulfills the read command by providing the dominant state of each bit of the data. In other words, the memory device 140 provides the originally written data in the first format (e.g., from the first location) as if the originally written data had been stored in the first format and the first location, thereby providing the bit-majority-based error correction transparently to the host device 110 and the system controller 130. In this way, the memory device 140 uses bit-majority-based on-chip error correction to provide error-free data. Based on performing on-chip error correction, the memory device 140 obviates a need for offloading the data for error correction, thereby improving information security. Moreover, the memory device 140 enables access to error-free data when error correction firmware is not yet loaded. Furthermore, by using a bit-majority circuit, the memory device 140 enables error correction with reduced die area relative to other techniques for on-chip error correction.

In some implementations, error-free data, which memory device 140 may store and output, may be used to perform one or more security operations. For example, the system controller 130 may transmit, to the memory device 140, a cryptographic signature associated with a command (e.g., a read command, a write command, or an erase command). The system controller 130 may generate the cryptographic signature based on, for example, the command (e.g., generated based on the instruction received from the host device 110), a cryptographic key (e.g., a private key or a secret key stored by the system controller 130), or a monotonic counter value, among other examples. The cryptographic key may be stored by the system controller 130 and by the memory device 140. The monotonic value may be based on, for example, a monotonic counter value stored by the system controller 130 and by the memory device 140. In some implementations, the cryptographic signature may be generated (e.g., by the system controller 130) by applying a hash-based message authentication code (HMAC) function or algorithm to the command, the cryptographic key, and the monotonic counter value.

The memory device 140 may verify the cryptographic signature prior to executing the command. If the memory device 140 verifies the cryptographic signature (e.g., by generating a matching signature), then the memory device 140 may process and/or perform the command. If the memory device 140 fails to verify the cryptographic signature (e.g., by generating a corresponding signature that does not match the cryptographic signature), or if the memory device 140 does not receive a cryptographic signature in connection with a command that requires a cryptographic signature (e.g., a security command), then the memory device 140 may refrain from processing and/or performing the command.

For example, the memory device 140 may generate a corresponding signature based on the same inputs used by the system controller 130 to generate the cryptographic signature, such as the command (received from the system controller 130), the cryptographic key (stored by the memory device 140), and the monotonic counter value (e.g., stored by the memory device 140). Thus, the memory device 140 and the system controller 130 may separately store the cryptographic key and may separately store the monotonic counter value, which may be modified (e.g., incremented) after each command is received, processed, and/or performed. In this way, each command is associated with a unique cryptographic signature (e.g., different from other commands), thereby increasing security.

To enable this cryptographic verification to be performed, the memory device 140 should be enabled to reliably store (e.g., free from errors) security data, such as the cryptographic key and the monotonic counter value. The error correction techniques described herein may enable the memory device 140 to read and write error-free security data with a higher level of reliability than is achieved using other techniques. This allows security operations, such as cryptographic verification, to be performed reliably.

As indicated above, FIG. 1 is provided as an example. Other examples may differ from what is described with regard to FIG. 1.

Figure 2:
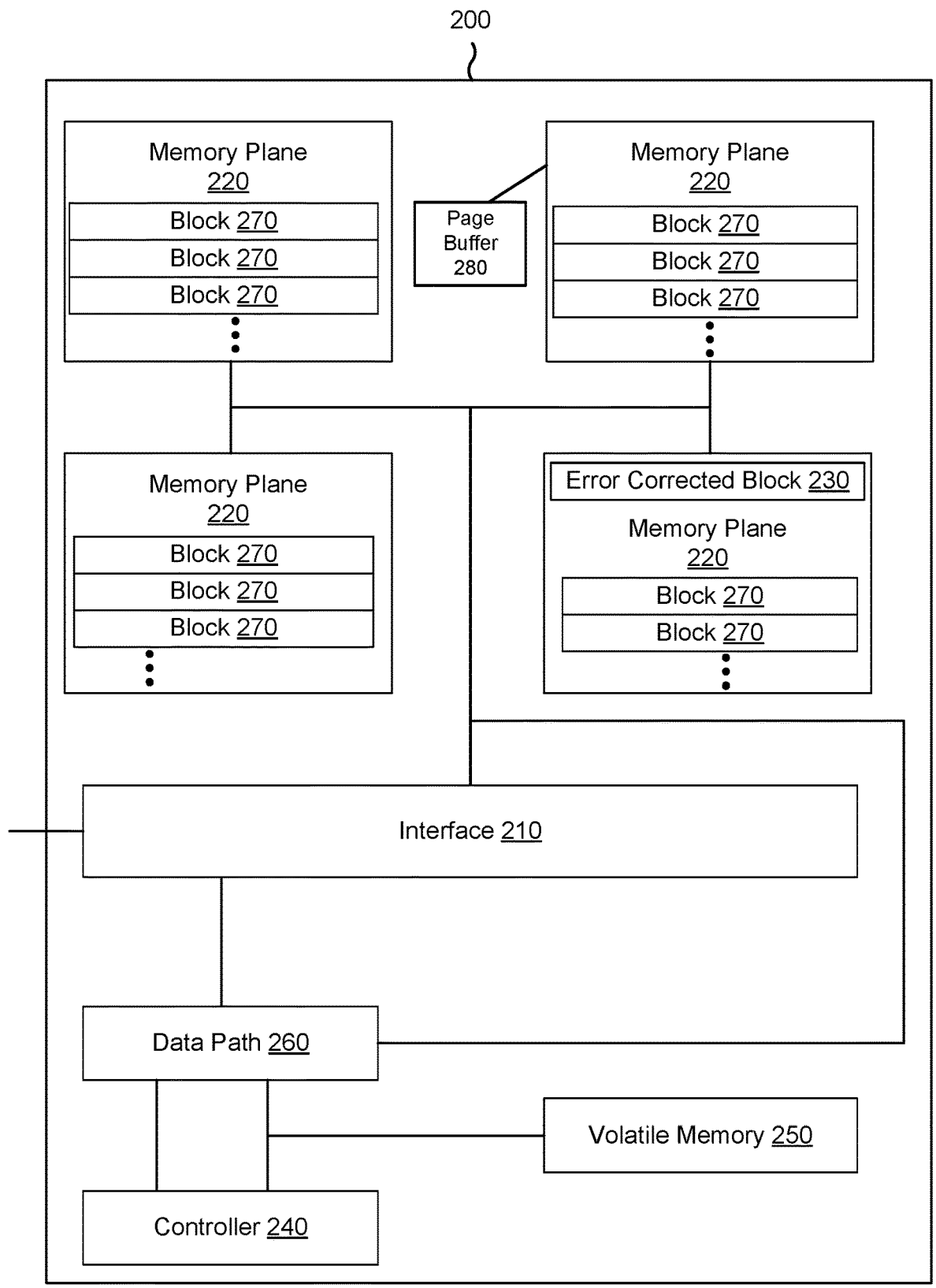
FIG. 2 is a diagram illustrating an example device capable of bit error management.

FIG. 2 is a diagram illustrating an example device 200 capable of bit error management. In some implementations, the device 200 is the memory device 140 described above in connection with FIG. 1. As shown, the device 200 may include an interface 210, one or more memory planes 220, an error corrected block 230, a controller 240, a volatile memory 250, a data path 260, and/or multiple blocks 270 (e.g., memory blocks).

The interface 210 may include one or more components configured to receive data from a device external from the device 200 (e.g., the system controller 130) and transmit the data to a component internal to the device 200 (e.g., a memory plane 220, the controller 240, the volatile memory 250, and/or the data path 260), or vice versa. For example, the interface 210 may include physical components (e.g., bond pads, contact pads, wires, metallic components, and/or electrically conductive components) that connect with and/or interface with the system controller 130. Additionally, or alternatively, the interface 210 may include one or more components configured to receive data from a first component internal to the device 200 (e.g., a memory plane 220) and transmit the data to a second component internal to the device 200 (e.g., the controller 240, the volatile memory 250, and/or the data path 260), or vice versa. In some implementations, the interface 210 may be configured to convert from a first data rate and/or a first data format to a second data rate and/or a second data format. Additionally, or alternatively, another component of the device 200 may perform a data format conversion. In some implementations, the interface 210 may be configured to convert from a first format to an intermediate format. For example, the interface 210 may convert from a first format to an intermediate format, and another component may convert from the intermediate format to a second format. The interface 210 may include one or more data buffers and/or one or more data registers for storing data to convert between different data rates or different data formats.

A memory plane 220 is a memory component described in more detail in connection with FIG. 3. A memory plane 220 may be disposed on a die and may include multiple memory blocks 270. A memory block 270 (sometimes called a "block") is a memory component described in more detail in connection with FIG. 3. One of the blocks 270 (or more than one of the blocks) may be designated as an error corrected block 230. The error corrected block 230 may store copies of data to enable device 200 to perform error correction. On example of data that may be subject to error correction within device 200 may be security data. The error corrected block 230 may be a reserved block or a dedicated block configured to store only the error corrected data, such as a security block that is a reserved block or a dedicated block configured to store only security data. Additionally, or alternatively, the error corrected block 230 may be a portion of any other block 270. A block 270 is a memory component described in more detail in connection with FIG. 3.

In some implementations, such as when the error corrected block 230 is a security block, the error corrected block 230 may be inaccessible to a host device, and the error corrected block 230 may only be accessible by a controller 240 and/or other components internal to the device 200. In some implementations, a block address of the error corrected block 230 may not exist in an address space accessible by the host device. Additionally, or alternatively, the address space accessible by the host device may be associated with a first format for data, but data stored within the error corrected block 230 may be associated with an address space associated with a second format for data, as described in more detail herein. In other words, the host device may instruct the device 200 to store data in a first address space of error corrected block 230 (or any other block 270) and the device 200 may store the data in a second, different address space of error corrected block 230 to enable error correction, as described in more detail herein. Security data may include data relating to cryptographic operations for the device 200 and/or a system that includes device 200. For example, the security data may include a cryptographic key (e.g., used to generate a cryptographic signature), a monotonic counter value (e.g., used to generate a cryptographic signature), and/or a record that indicates access restrictions for individual memory blocks 270 (e.g., a read restriction, a write restriction, and/or an erase restriction). Although the device 200 is shown as including four memory planes 220, the device 200 may include a different quantity of memory planes 220.

The controller 240 may include one or more components configured to perform operations associated with bit error management. For example, the controller 240 may receive a command to program a single copy of data to error corrected block 230 and may duplicate the single copy of data to program a plurality of copies of data to error corrected block 230. In this case, when the device 200 receives a command to read the single copy of data from error corrected block 230, the controller 240 of the device 200 may use an error correction circuit to process the plurality of copies of data, determine a dominant bit state for the plurality of copies of data, program a single copy of data to error corrected block 230 based on the dominant bit state, and allow the single copy of data to be read from error corrected block 230. In this way, the device 200 internally error corrects data stored in error corrected block 230.

The controller 240 may include, for example, one or more processors, a microcontroller, an ASIC, and/or an FPGA. In some implementations, a non-transitory computer-readable medium (e.g., volatile memory and/or non-volatile memory) may store a set of instructions (e.g., one or more instructions or code) for execution by the controller 240. The controller 240 may execute the set of instructions to perform one or more operations or methods described herein. For example, the controller 240 may execute firmware instructions stored in a memory plane 220 (e.g., in a read-only memory block of the memory plane 220), which may be loaded into volatile memory 250 for execution by the controller 240. Additionally, or alternatively, the controller 240 may execute one or more instructions received from the system controller 130 and/or the host device 110. In some implementations, execution of the set of instructions, by the controller 240, causes the controller 240 and/or the device 200 to perform one or more operations or methods described herein. In some implementations, hardwired circuitry is used instead of or in combination with the instructions to perform one or more operations or methods described herein. Additionally, or alternatively, the controller 240 and/or one or more components of the device 200 may be configured to perform one or more operations or methods described herein. Thus, implementations described herein are not limited to any specific combination of hardware circuitry and software.

The volatile memory 250 may include one or more components configured to store data. The volatile memory 250 may store the data only when the volatile memory 250 is powered on and may lose the data when the volatile memory 250 is powered off. For example, the volatile memory 250 may be random-access memory (RAM), such as static RAM (SRAM) or dynamic RAM (DRAM).

The data path 260 may include one or more components configured to transfer data between components internal to the device 200. For example, the data path 260 may include one or more components configured to transfer data between the interface 210 and one or more other components internal to the device 200 (e.g., a memory plane 220, the controller 240, and/or the volatile memory 250). Additionally, or alternatively, the data path 260 may include one or more components configured to transfer data between the volatile memory 250 and a memory plane 220 (e.g., based on an instruction or command from the controller 240). In some implementations, the data path 260 may operate on the data to be transferred to convert the data from first data to second data or from a first format to a second format.

The quantity and arrangement of components shown in FIG. 2 are provided as an example. In practice, the device 200 may include additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of the device 200 may perform one or more functions described as being performed by another set of components of the device 200.

Figure 3:
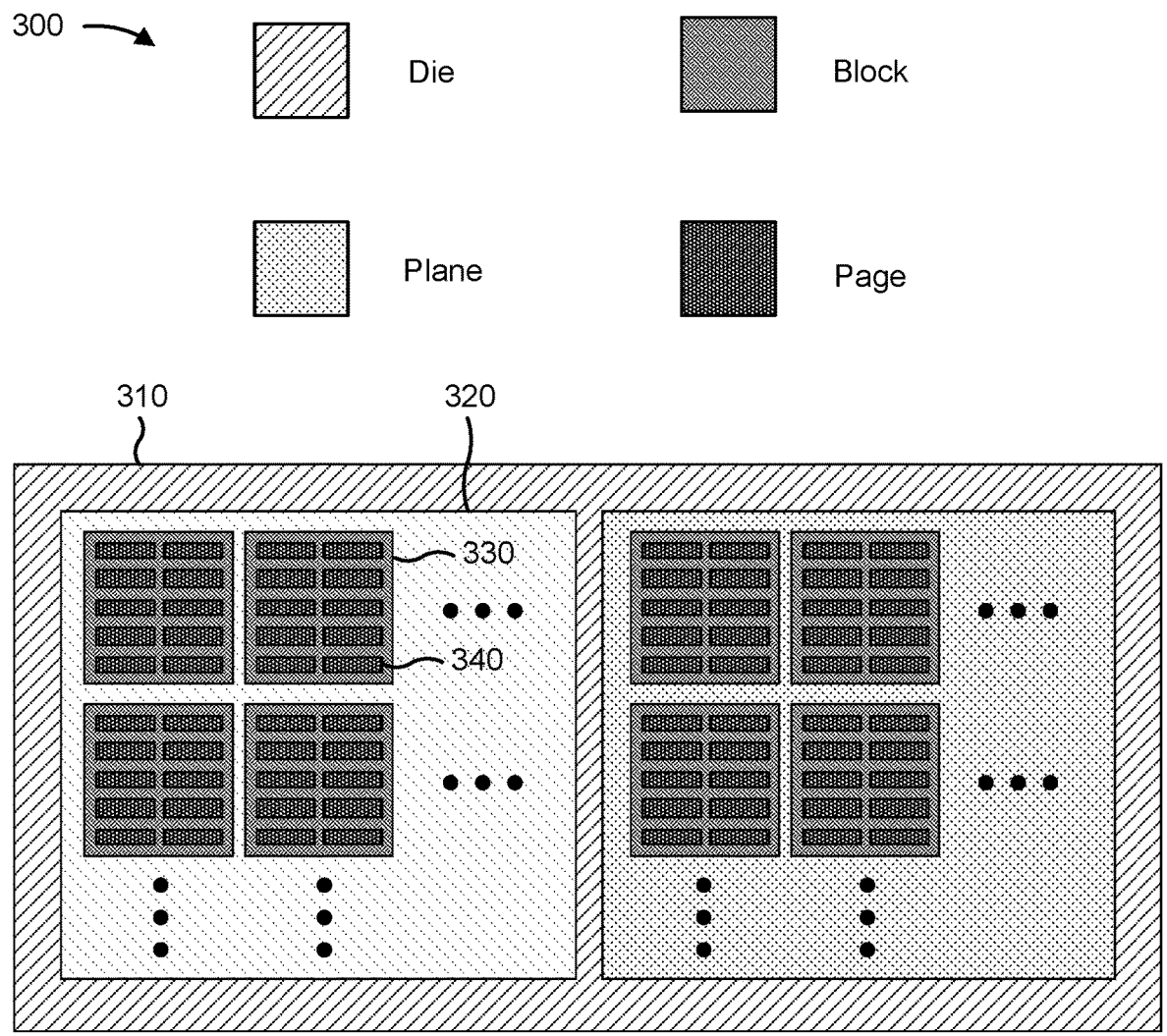
FIG. 3 is a diagram illustrating an example memory architecture that may be used by the device of FIG. 2.
Figure 3:
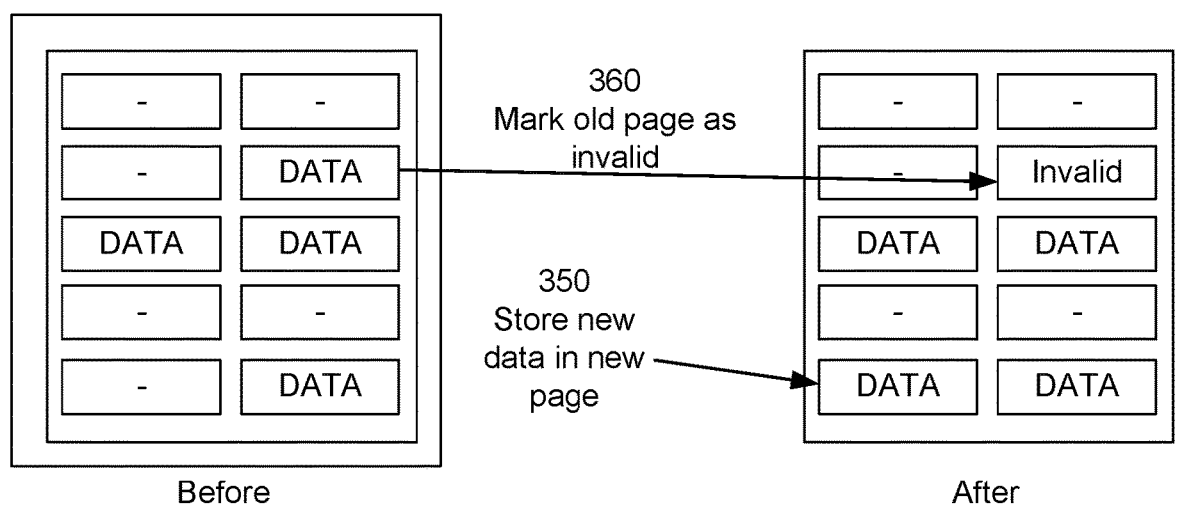

FIG. 3 is a diagram illustrating an example memory architecture 300 that may be used by the device 200 for bit error management. The device 200 may use the memory architecture 300 to store data. As shown, the memory architecture 300 may include a die 310, which may include multiple planes 320. A plane 320 may include multiple blocks 330. A block 330 may include multiple pages 340. Although FIG. 3 shows a particular quantity of planes 320 per die 310, a particular quantity of blocks 330 per plane 320, and a particular quantity of pages 340 per block 330, these quantities may be different than what is shown. In some implementations, the memory architecture 300 is a NAND memory architecture.

The die 310 is a structure made of semiconductor material, such as silicon. The device 200 may be fabricated on the die 310 (e.g., via a semiconductor device fabrication process). In some implementations, a die 310 is the smallest unit of memory that can independently execute commands. A memory chip or package may include one or more dies 310.

Each die 310 of a chip includes one or more planes 320. A plane 320 is sometimes called a memory plane. In some implementations, identical and concurrent operations can be performed on multiple planes 320 (sometimes with restrictions). Each plane 320 includes multiple blocks 330. A block 330 is sometimes called a memory block. Each block 330 includes multiple pages 340. A page 340 is sometimes called a memory page. A block 330 is the smallest unit of memory that can be erased. In other words, an individual page 340 of a block 330 cannot be erased without erasing every other page 340 of the block 330. A page 340 is the smallest unit of memory to which data can be written (the smallest unit of memory that can be programmed with data) and from which data can be read. The terminology "programming" memory and "writing to" memory may be used interchangeably. A page 340 may include multiple memory cells (sometimes called a string of memory cells) that are accessible via the same access line (sometimes called a word line).

In some implementations, read and write operations are performed for a specific page 340, while erase operations are performed for a block 330 (e.g., all pages 340 in the block 330). In some implementations, to prevent wearing out of memory, all pages 340 of a block 330 may be programmed before the block 330 is erased to enable a new program operation to be performed to a page 340 of the block 330. After a page 340 is programmed with data (called "old data" below), that data can be erased, but that data cannot be overwritten with new data prior to being erased. The erase operation would erase all pages 340 in the block 330, and erasing the entire block 330 every time that new data is to replace old data would quickly wear out the memory cells of the block 330. Thus, rather than performing an erase operation, the new data may be stored in a new page (e.g., an empty page), as shown by reference number 350, and the old page that stores the old data may be marked as invalid, as shown by reference number 360. The device 200 may then point operations associated with the data to the new page and may track invalid pages to prevent program operations from being performed on invalid pages prior to an erase operation. When the pages 340 of a block 330 are full (e.g., all or some threshold quantity of pages are either invalid or store valid data), the device 200 may copy the valid data (e.g., to a new block or to the same block after erasure) and may erase the block 330.

As indicated above, FIG. 3 is provided as an example. Other examples may differ from what is described with regard to FIG. 3.

Figure 4A:
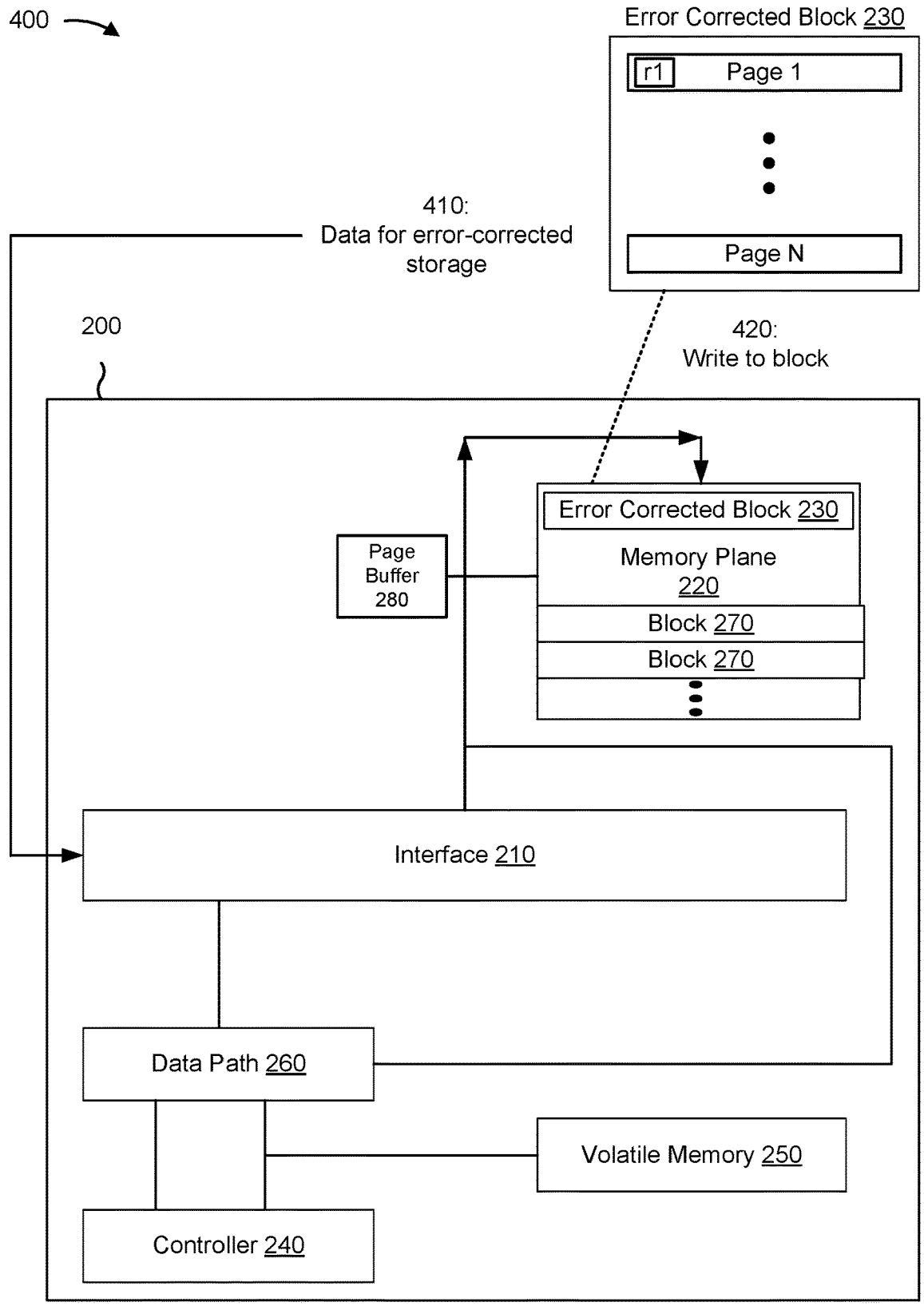
FIGS. 4A-4C are diagrams illustrating an example associated with programming data to a device capable of bit error management.
Figure 4B:
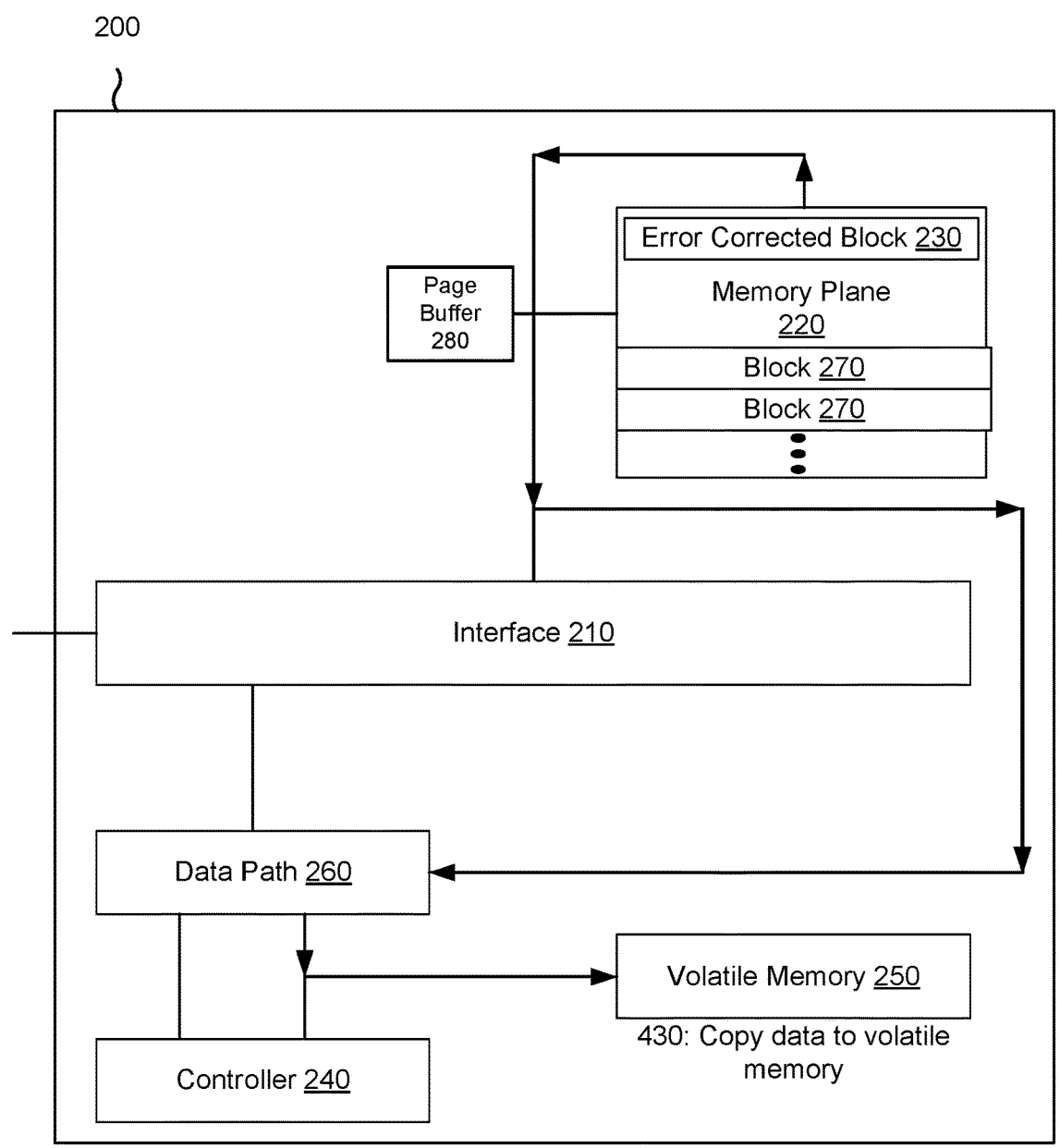
Figure 4C:
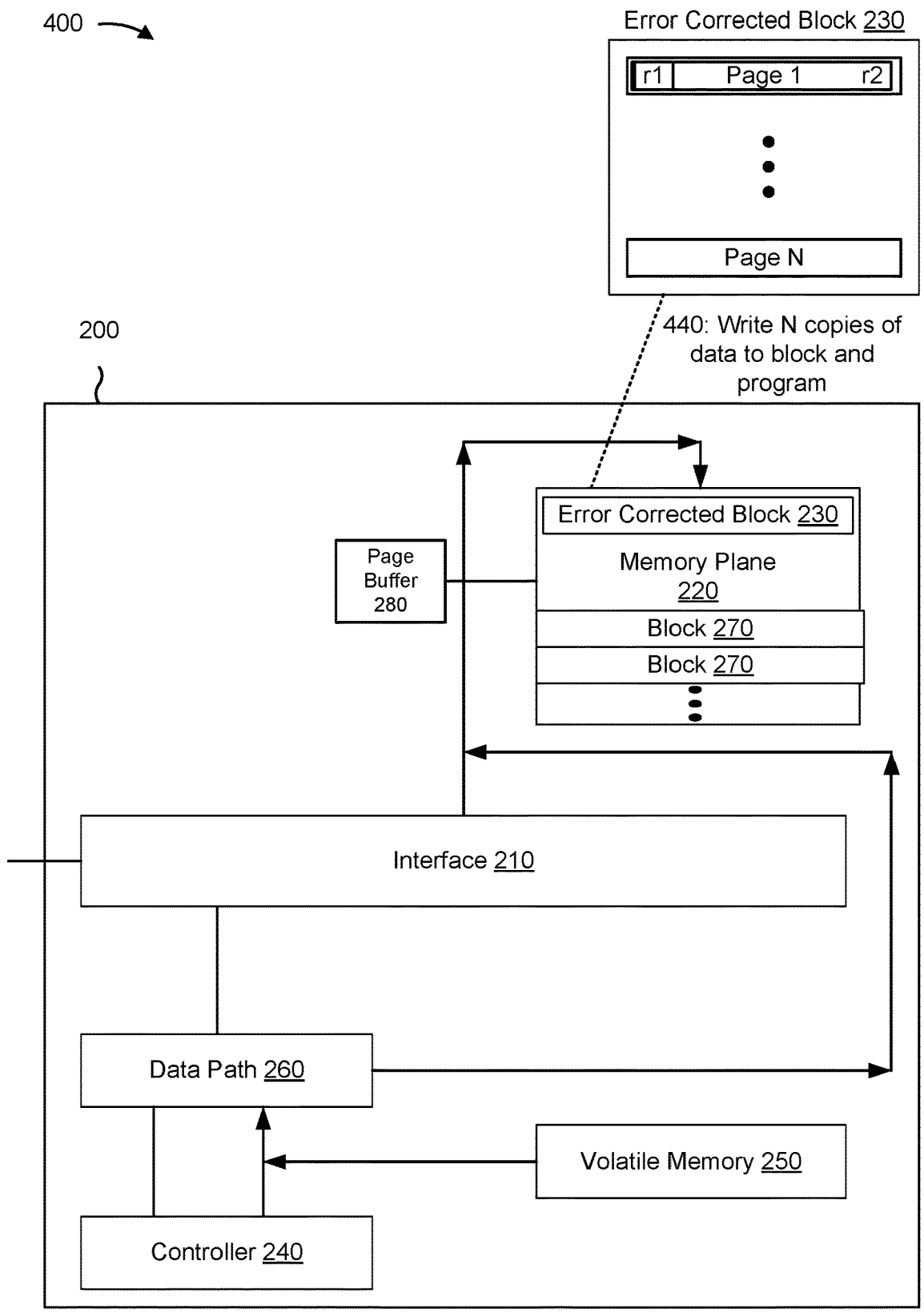

FIGS. 4A-4C are diagrams of an example implementation 400 associated with programming data to a device capable of bit error management. As shown in FIG. 4A, example implementation 400 includes a device 200 (e.g., a memory device, such as a NAND memory device).

As further shown in FIG. 4A, and by reference number 410, the device 200 may receive data for error-corrected storage. For example, the device 200 may receive data via interface 210. In some implementations, the data may include an indication that the data is to be stored for error correction, as described herein. For example, the device 200 may receive a command to program (or write) the data at a range of addresses that corresponds to error corrected block 230. In this case, as a particular example, the data may be 1024 bits representing approximately 1/16 of a page. For example, the device 200 may receive the 1024 bits representing approximately 1/16 of a page and may determine to duplicate the data 16 times, to enable a subsequent bit majority check, which causes the duplicated data to use a complete page of storage in error corrected block 230, as described in more detail herein.

Additionally, or alternatively, the device 200 may receive a command to program a particular type of data. For example, the device 200 may receive a command to program data and an indication that the data is associated with a security operation for chip initialization, such as security data associated with generating a cryptographic signature or cryptographic key (e.g., data for which a high level of reliability may be desirable). For example, the command may include a command to store a cryptographic key, a command to update a stored cryptographic key, a command to update a monotonic counter value that is used to generate a cryptographic signature, and/or a command to store and/or update an indication of one or more access restrictions (e.g., a read access restriction, a write access restriction, or an erase access restriction) associated with one or more block 270.

In some implementations, device 200 may receive the data in a first format. The first format may include the data being a single copy of the data. In other words, the first format may differ from a second format in that the second format represents multiple copies of the data in a format that aligns with the error correction circuit and the first format represents a single copy of the data. As an example, if the first two bytes of data are, in the first format, byte 0=0xA5 (1010 0101) and byte 1=0xC9 (1100 1001), the data set for the second format (in an 8-bit majority circuit) is: "A5, 5A, A5, 5A, A5, 5A, A5, 5A, C9, 36, C9, 36, C9, 36, C9, 36," where 5A (0101 1010) and 36 (0011 0110) represent inversions of A5 and C9, respectively, as described in more detail herein.

Additionally, or alternatively, the first format may include the data being associated with a first range of addresses, r1 as shown in FIG. 4A, of a page in the device 200 for storage. In other words, the first format may differ from the second format in that the first format is associated with a first range of addresses (e.g., a range of memory addresses corresponding to a single copy of the data) and the second format is associated with a second range of addresses (e.g., a range of memory addresses corresponding to multiple copies of the data).

Although some aspects are described herein in terms of a single copy of the data and multiple copies of the data, it should be understood that the term "data" is used broadly, such that a single copy of the data may, itself, include multiple copies of some underlying data. In this case, the multiple copies of the single copy may include multiple copies of those multiple copies that are included in the single copy. In other words, if the data is a representation (e.g., a set of bits) of a string "AA," then the data itself includes multiple copies of an underlying string "A." Multiple copies of the data "AA" may be, for example, a string "AAAAAA." Accordingly, the term "a single copy" of the data can include multiple copies of some underlying data, and the term "multiple copies" of the data is used with reference to the data represented by "a single copy" of the data.

As further shown in FIG. 4A, and by reference number 420, the device 200 may write the data to the page buffer of a block. For example, the device 200 may write the data, received via interface 210, in a first format to the page buffer of block 230 (e.g., to volatile memory). In some implementations, the device 200 may perform an Open NAND Flash Interface (ONFI) write procedure. For example, the device 200 may write 1024 bits of data to the page buffer 280 of block 230 with a latency of, for example, 1000*k, where k represents a per bit ONFI write procedure latency. In this case, the data is written to the page buffer 280 associated with block 230 (and with other blocks of device 200), which may be volatile memory, but is not programmed to an array of block 230 (e.g., until the data is in the second format). In some implementations, the device 200 may write the data to a secondary data cache (SDC) of the page buffer. For example, the device 200 may write the data to the SDC in accordance with the command to program the data that accompanied the data, but may forgo programming the data from the SDC associated with error corrected block 230 to an array associated with error corrected block 230. In this case, the device 200 may program the data to the array associated with error corrected block 230 in the second format as multiple copies of the data, as described in more detail herein.

As shown in FIG. 4B, and by reference number 430, the device 200 may copy the 1024 bits of data from the SDC associated with error corrected block 230 to volatile memory 250 (e.g., an SRAM component) with a latency of, for example, approximately 7.7 microseconds (μm).

As shown in FIG. 4C, and by reference number 440, the device 200 may write multiple copies of the data to a block and may program the data. For example, based on copying the data to volatile memory 250 (e.g., for temporary storage during the copying procedure), the device 200 may write multiple copies of the data to error corrected block 230. In this case, and with regard to the aforementioned example, the device 200 may replicate each instance of 1024 bits of data from volatile memory 250 to the SDC associated with error corrected block 230, and may program the 1024 bits of data from the SDC to the array of error corrected block 230 in the second data format aligned to the error correction circuit, thereby completing the program command received by the device 200. Replicating the 1024 bits of data to the SDC may have a latency of, for example, approximately 123 μs and programming the 1024 bits data to the array may have a latency specific to a configuration of the device 200 (a programming latency). The device 200 may perform multiple iterations of replicating the 1024 bits of data to the SDC and programming the 1024 bits of data to the array until the device 200 has generated a configured quantity of copies of the data. For example, the device 200 may generate and program 16 copies of the data. In this case, with the data including 1024 bits, the device 200 fills a single page with the 16 copies of the data. In another example, the device 200 may generate 8 copies of 2000 bits of data. In another example, the device 200 may generate another quantity of copies (e.g., 2 or more copies, 3 or more copies, etc.) and fill a portion of a page (e.g., less than a whole page), a single whole page, or multiple pages, among other examples.

In some implementations, controller 240 may cause copies of the data to be replicated across multiple pages rather than within a single page. For example, controller 240 may cause a first copy of the data and a second copy of the data to be replicated across a first page and a second page, respectively, in non-volatile memory. In this case, controller 240 may cause a first copy of the data to be stored in a NAND column of the first page (e.g., a byte offset within the first page) and may cause a second copy of the data to be stored in the same NAND column of the second page (e.g., the same byte offset within the second page). In this case, the first copy of the data and the second copy of the data may be associated with, in replicated pages, a common data line across two different blocks (e.g., of multiple configured error corrected blocks 230) or different data lines of a common block. In some implementations, when the copies of the data are stored across pages (rather than within a single page), a quantity of copies of the data is constrained to not exceed a size of an addition capability of the page buffer (e.g., approximately 3 copies, in some implementations) to enable bit majority calculation for copies stored across pages.

In some implementations, controller 240 may cause data to be written and programmed to the device 200. For example, controller 240 may cause data to be written to the page buffer 280 of a target plane 220, but not programmed to an array of the target plane 220 (e.g., of a block 230). After a program command is issued, controller 240 may move the data, in the first format, to SRAM and copy the data back to the page buffer 280 (e.g., to the SDC), as described above in an expanded format (e.g., the second format). The controller 240 causes the expansion of the data from the first format to the second format in connection with copying the dta from the SRAM to the SDC. For example, if the data is "AA, BB, CC, DD, . . . ", the controller 240 causes the data to be transformed into "AA, inverse of AA (iAA), AA, iAA . . . , BB, iBB, BB, iBB, . . . , etc. until, for example, 1 kB of data is expanded to match a page size. In this case, a first range of addresses represents ¹⁄₁₆ of a page size and a second range of addresses, in which the data is stored in the second format, corresponds to the page size. The SDC stores the data in the second format (e.g., copies of the data, which may include some copies being inversions of the data), which corresponds to the error correction scheme (bit majority) that is to be used, as described in more detail herein.

As indicated above, FIGS. 4A-4C are provided as an example. Other examples may differ from what is described with regard to FIGS. 4A-4C.

Figure 5A:
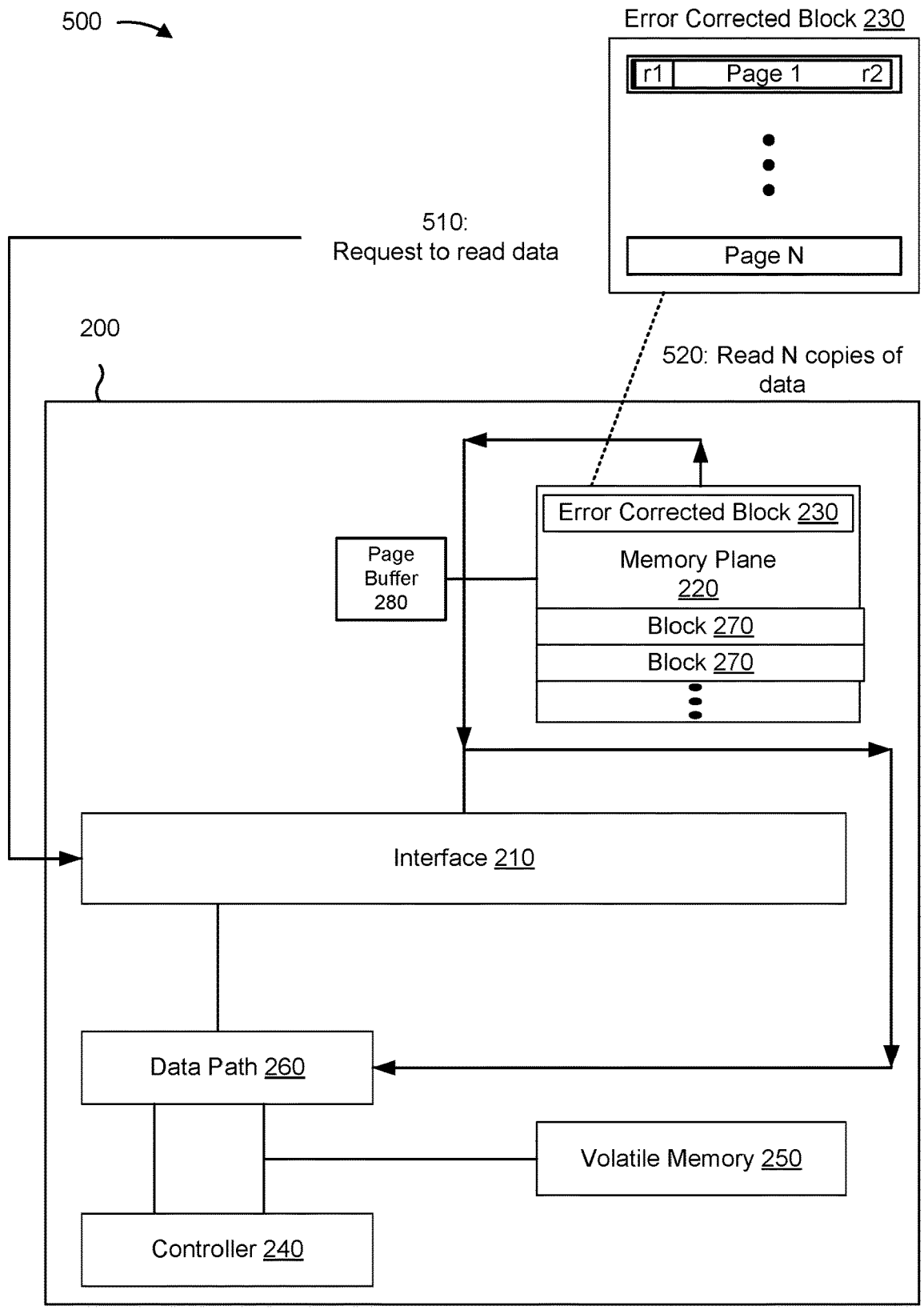
FIGS. 5A-5D are diagrams illustrating an example associated with reading data from a device capable of bit error management.

FIGS. 5A-5D are diagrams of an example implementation 500 associated with reading data from a device capable of bit error management. As shown in FIG. 5A, example implementation 500 includes a device 200 (e.g., a memory device, such as a NAND memory device).

As further shown in FIG. 5A, and by reference number 510, the device 200 may receive a request to read data. For example, the device 200 may receive, via the interface 210 and using the controller 240, a read command identifying a first range of addresses, r1, at which to read data. In this case, the read command may correspond to the program command described with regard to FIG. 4A. For example, the device 200 may receive a command to read the single copy of data that the device 200 was instructed to store in the error corrected block 230 (and which the device 200 stored as multiple copies of the data in the error corrected block 230).

In some implementations, the device 200 may receive the request to read data before loading of system firmware of a system (e.g., storage system 120 or system 100) that includes the device 200. In this case, error correction performed by the device 200 may enable the device 200 to provide an accurate read of the data without needing system firmware to be loaded to perform external error correction on the data.

As shown by reference number 520, the device 200 may read multiple copies of the data from error corrected block 230 to the data path 260. For example, based on receiving the command to read data in a first format (e.g., associated with a first range of addresses, r1), the device 200 (e.g., using the controller 240) may read data in a second format (e.g., associated with a second range of addresses, r2) from the error corrected block 230 and to the data path 260. In some implementations, the device 200 may determine to read the multiple copies based on the first range of addresses corresponding to error corrected block 230. For example, with regard to the example of FIGS. 4A-4C, when the device 200 receives a read command with the first range of addresses representing ¹⁄₁₆ of a page, the device 200 may determine that the whole page includes multiple copies of data in the ¹⁄₁₆ of the page. In this case, the device 200 may read sixteen 1024 bit copies of data from error corrected block 230. In some implementations, the device 200 may move the data from an SDC to data path 260. For example, the device 200 may read the whole page from the array to the SDC (e.g., with a latency specific to a configuration of the device 200) and may copy the whole page from the SDC to the data path 260 for a bit majority check (e.g., with a latency of, for example, approximately 30 μs for copying the page from SDC to data path 260 and for performing a bit majority check) and moving the corrected data back to the page buffer 280, as described herein.

Figure 5B:
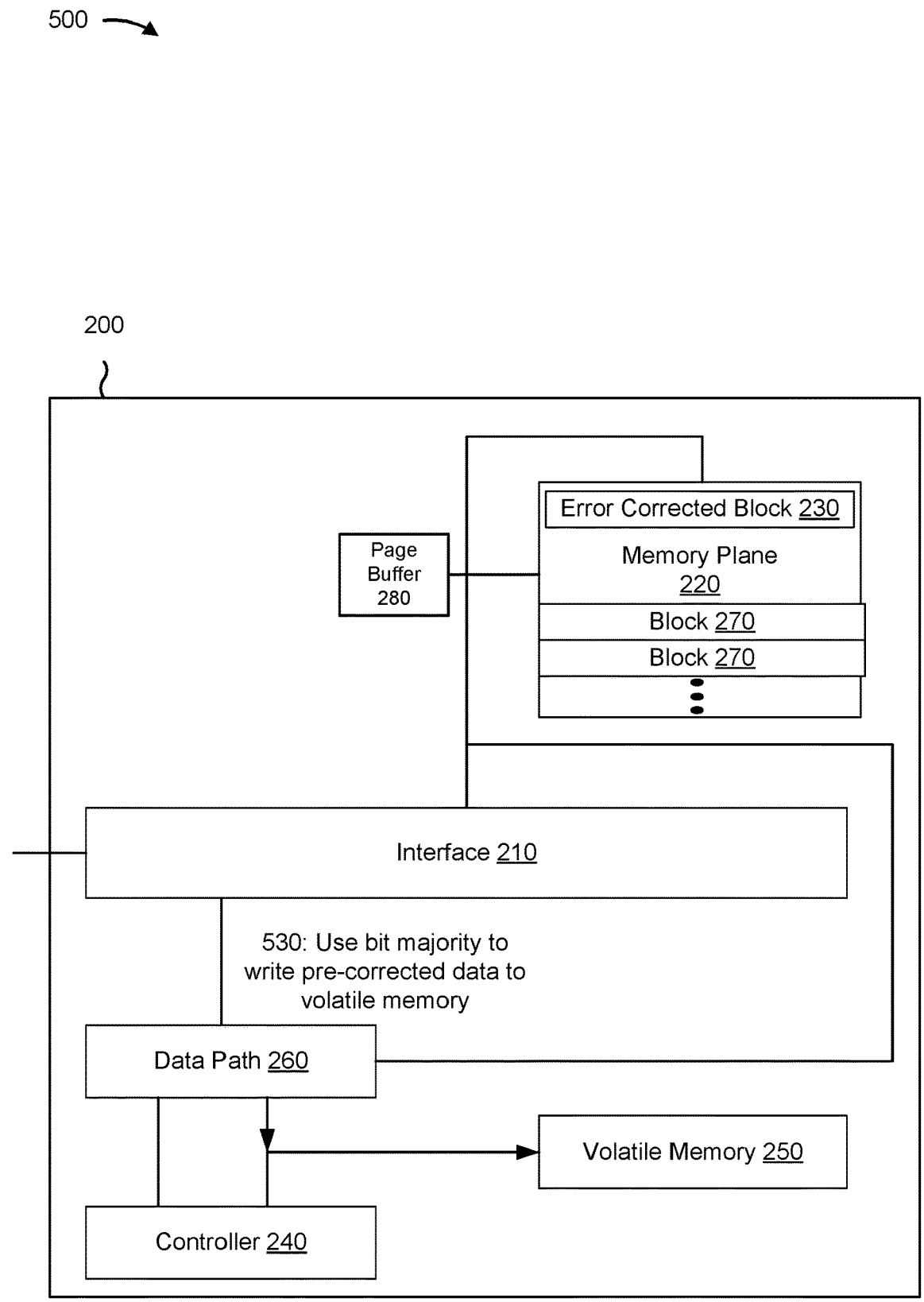

As shown in FIG. 5B, and by reference number 530, the device 200 may use a bit majority operation to write corrected data to volatile memory 250. For example, the device 200 may compare multiple copies of a bit of the data to determine a dominant state of the bit and may write the dominant state of the bit to volatile memory 250. In this case, the device 200 may perform comparisons and write dominant bit states for each bit of the data (e.g., using the multiple copies of the data read from error corrected block 230).

Figure 5C:
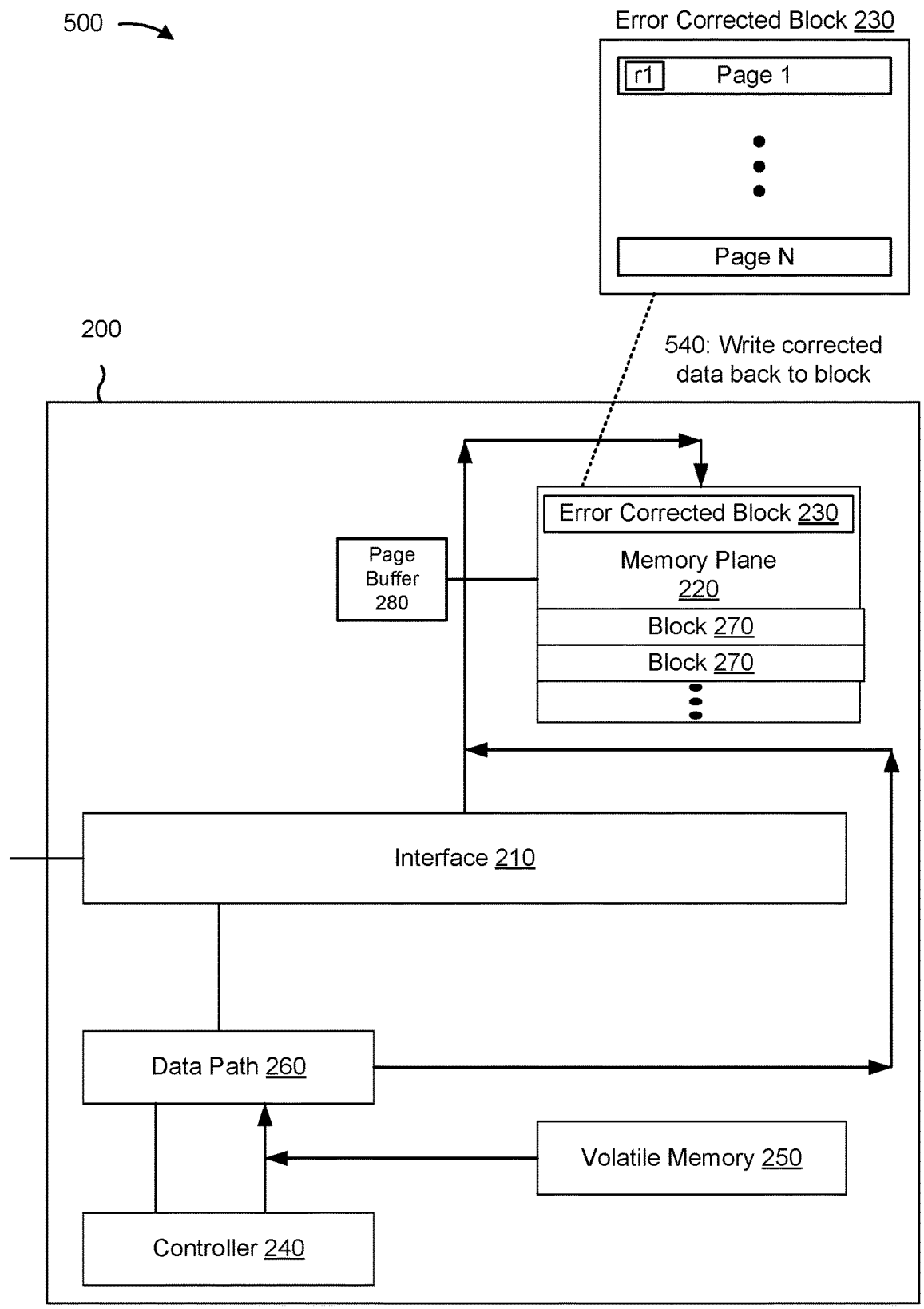

As shown in FIG. 5C, and by reference number 540, the device 200 may write the corrected data back to the error corrected block 230. For example, the device 200 may copy the dominant bit states for each bit of the data from the volatile memory 250 to the error corrected block 230 and write the dominant bit states to cells corresponding to the first range of addresses (e.g., in the first format), r1. In this case, with regard to the aforementioned example, the device 200 may move 1024 bits of corrected data from volatile memory 250 to an SDC of error corrected block 230 (e.g., with a latency of, for example, approximately 7.7 µs).

Figure 5D:
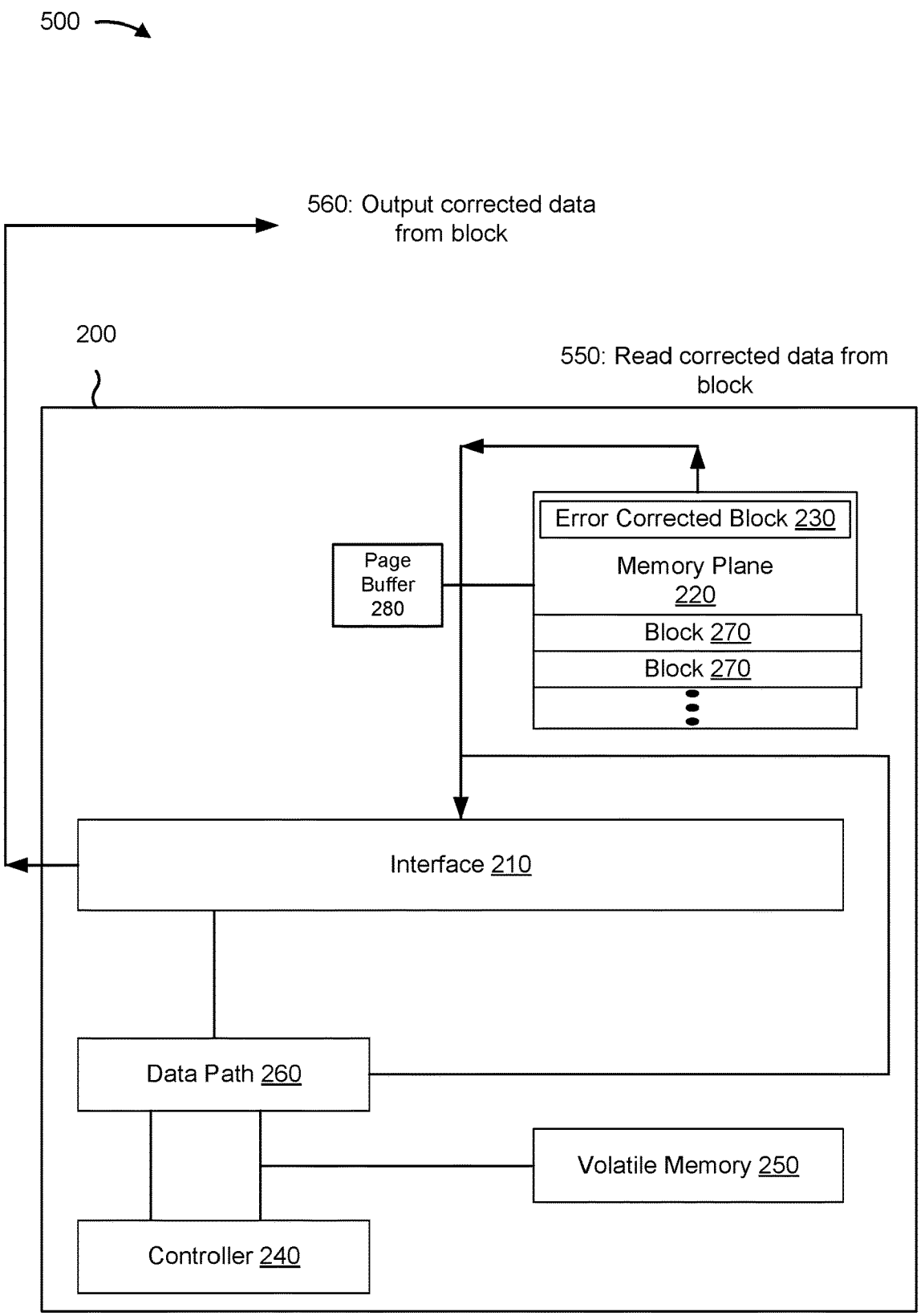

As shown in FIG. 5D, and by reference numbers 550 and 560, the device 200 may read the corrected data from the page buffer of block 230 and output the corrected data. For example, the device 200 may execute an ONFI read command to read the dominant bit states from the first range of addresses and provide the error corrected data from the block. In this case, with regard to the aforementioned example, the device 200 may read out the 1024 bits of corrected data with a latency of 1000*l, where l is an OFNI read time for each bit. In this way, the device 200 provides error corrected on data without an external error correction circuit or software.

As indicated above, FIGS. 5A-5D are provided as an example. Other examples may differ from what is described with regard to FIGS. 5A-5D.

FIGS. 6 and 7A-7C are diagrams of example implementations 600, 700, 710, and 720, respectively, associated with a bit majority check.

Figure 6:
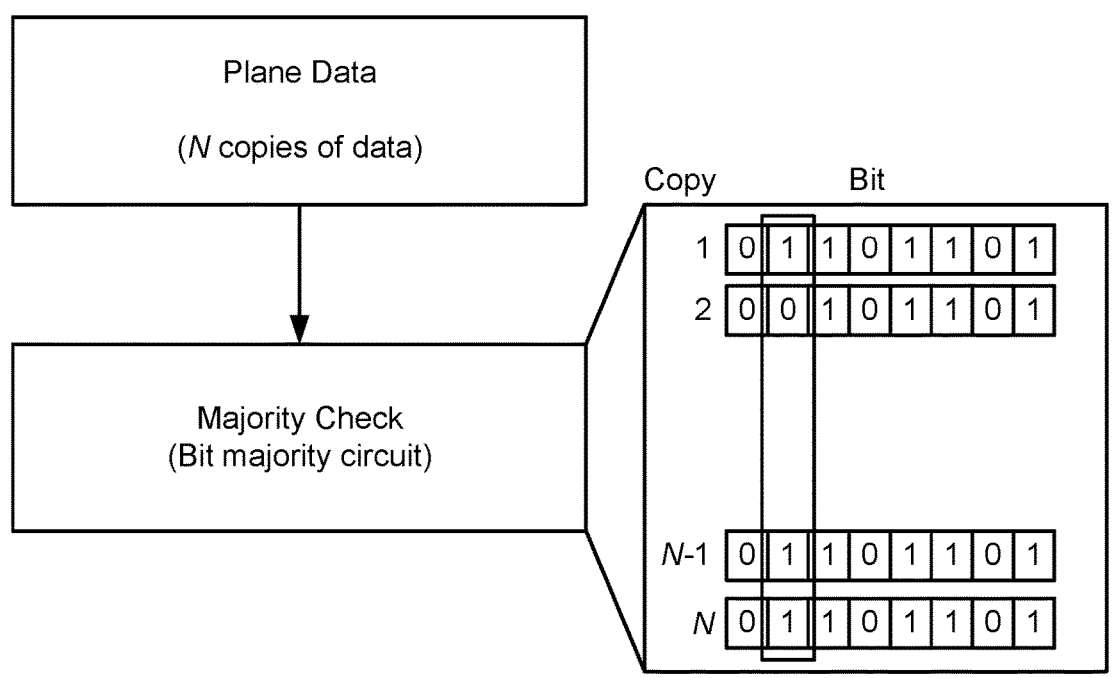
FIG. 6 is a diagram illustrating an example associated with a bit majority check.

As shown in FIG. 6, in example implementation 600, when a device 200 reads out data from a plane (e.g., from one or more pages of error corrected block 230 or from a set of error corrected blocks 230), the device 200 may read out a quantity N copies of the data stored to enable a bit majority check. As described above, the device 200 reads the data to an error correction circuit (e.g., a bit majority circuit) in a data path or a page buffer, which may enable the device to perform a bit majority check. To perform the bit majority check, the device 200 may combine like bits of each byte copy in multiple copies of the data. For example, the device 200 may sum up the state of bit 0 of each byte in byte 0 through byte N. The adder circuit will sum the total count of 1's per bit location of each copy. The device 200 can then use logic or the two most significant bits of the adder to determine the majority state of the bit.

FIG. 6 shows the second bit from a first copy of the data ('1'), a second copy of the data ('0'), . . . , an N−1-th copy of the data ('1'), and an Nth copy of the data (1'). The device 200 may combine the copies of the bits to determine a dominant state of the copies of the bits (e.g., the bit value, 1 or 0, that occurs the greater quantity of times, such as in more than half of the stored copies). With reference to the examples of FIGS. 7A-7C, using a 16-bit majority, the most significant bits MSBs are b<4> and b<3>. As described in more detail herein, a special case to detect an error or undetermined bit majority can be set when only the second most significant bit of the adder circuit is high (1) and all other bits are low (0).

Figure 7A:
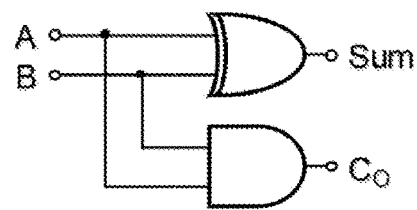
FIGS. 7A-7C are diagrams of circuitry associated with a bit majority check.
Figure 7B:
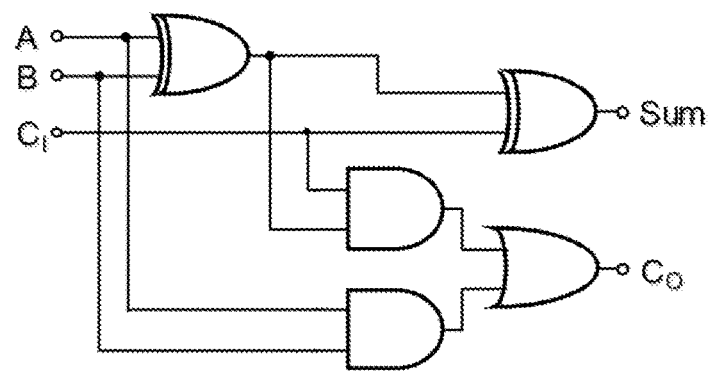

As shown in FIGS. 7A and 7B, and by example implementations 700 and 710, respectively, the error correction circuit may use a set of adder circuits, such as a partial adder or a full adder, as shown, to determine the dominant state of the bits of the data. As shown, for a partial adder, the device 200 may add bit (A) of the first copy and a bit (B) of the second copy to determine a sum (Sum) and a carryover ($C_O$). As shown, for a full adder, the device 200 may add the first copy of the bit (A) and the second copy of the bit (B) with a carryover from a previous adder ($C_1$) to determine a sum (Sum) and a further carryover ($C_O$).

Figure 7C:
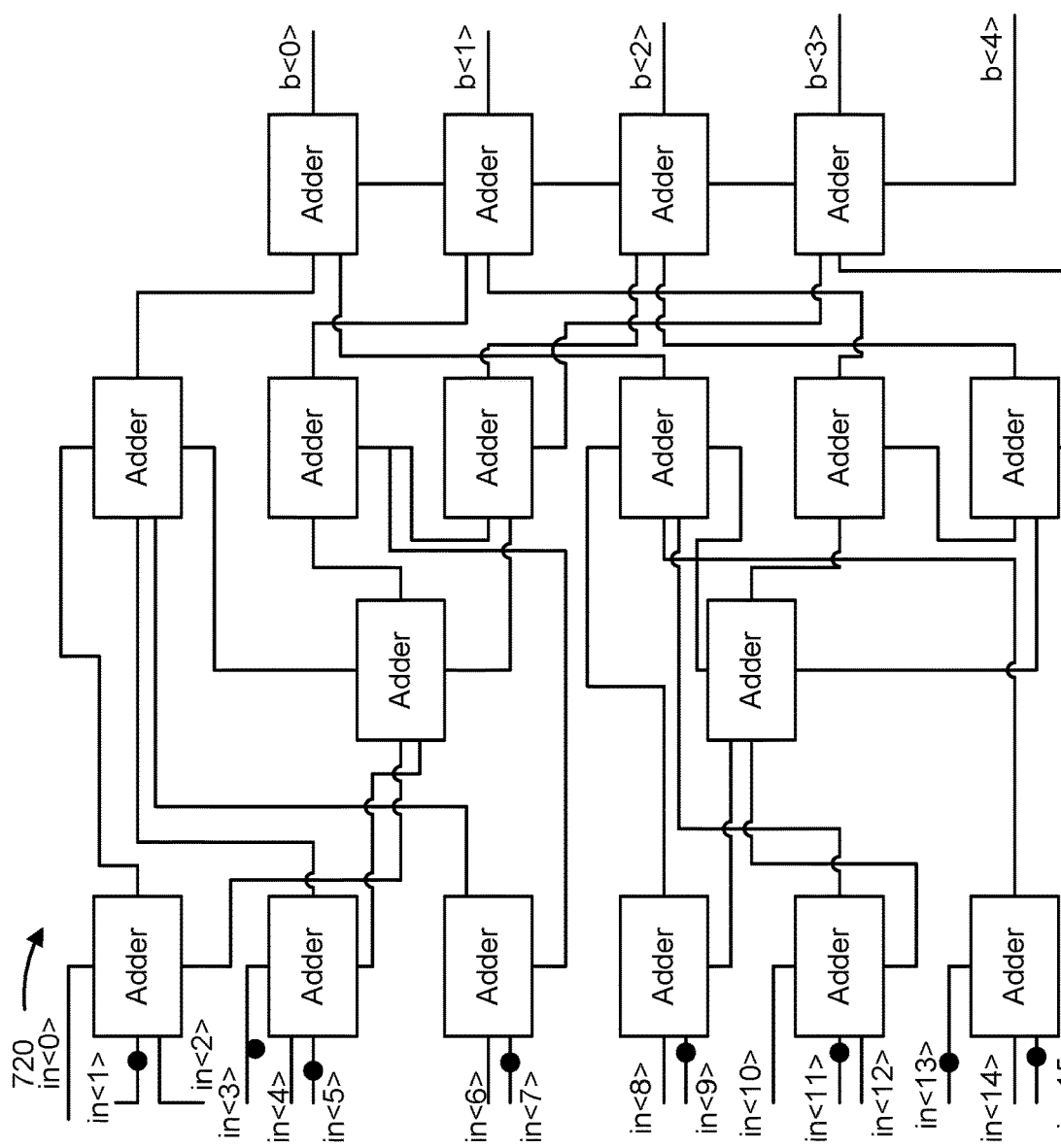

As shown in FIG. 7C, and by reference number 720, a plurality of adder circuits (e.g., partial adders and/or full adders) may be nested to allow for combining (e.g., addition) of any quantity of bits. For example, for 16-bit addition (e.g., when 16 copies of the data are stored), the error correction circuit may include 8, 16-bit adders. In contrast, for 8-bit addition (e.g., when 8 copies of the data are stored), the error correction circuit may include 8, 8-bit adders. Additionally, or alternatively, other quantities of copies of the data (and associated quantities of adders) may be possible, such as three or more copies of the data. In some implementations, the controller 240 of the device 200 may determine the dominant bit state using a subset of bits of a multi-bit output of the adder circuits. For example, the controller 240 may compare most significant bits (MSBs) bit 4 (b<4>) and bit 3 (b<3>) to determine the dominant bit state. As shown in the "Truth Table", when the sum is 7 or less, which is represented by a binary value of 00111 or less, the dominant bit state is '0'. In contrast, when the sum is 8 or more, which is represented by a binary value of 01000 or greater, the dominant bit state is '1'. Accordingly, all cases where the dominant bit state is '0' have a binary value with leading bits (the MSBs) of '00'. In contrast, all cases where the dominant bit state is '1' have a binary value with leading bits (the MSBs) of '01' or '10'. Accordingly, the controller 240 may compare only the MSBs representing the leading bits to identify the dominant bit state, rather than comparing all the bits. For example, if b<4> and b<3> are the same value (e.g., b<4> is '0' and b<3> is '0'), the dominant bit state is '0'. In contrast, if b<4> and b<3> are different values (e.g., b<4> is '0' and b<3> is '1' or <b4> is '1' and b<3> is '0'), the dominant bit state is '1'. Although the "Truth Table" is shown for illustration, determinations may be based on, for example, a logic circuit, among other examples. Although some implementations are described herein as using adder circuits, it should be understood that another form of underlying circuitry to compare values of copies of data may be possible.

In some implementations, an error correction circuit includes one or more inverters. For example, as shown, the error correction circuit of FIG. 7C includes an inverter at adder input associated with all odd bit inputs, i.e., bit 1 (in<1>), among other adder inputs. An inverter may be configured to flip a value of a bit to an opposite bit value. For example, when an inverter receives a '0' as input, the inverter may output a '1'. Similarly, when an inverter receives a '1' as input, the inverter may output a '0'. In some implementations, the error correction circuit may invert a subset of copies of a bit. For example, the error correction circuit may invert all odd byte copies. In this case, when the error correction circuit uses the adder circuits to sum the bits, the error correction circuit can identify a case where there has been an error in overwriting, reading, or erasing the bits (e.g., when the device 200 is reading data that is blank). For example, when the device 200 reads data that is solid (e.g., all '0' or all '1') without inverters, the device 200 finds no errors in the data (e.g., the device 200 expects that all copies of the bits should be the same). In contrast, with inversion of the odd bytes, the device 200 reads the same data as half '0's and half '1's, based on inverting half the bits. In this case, the device 200 can identify the case where there is no dominant bit state (and the bits are split evenly between the two states) as corresponding to an error in overwriting, reading, or erasing data. For example, as shown in the "Truth Table", a controller 240 of the device 200 may determine that an erase error has occurred when, for example, the bit output of the adders is "0100", which indicates an even bit state, corresponding to an error "e". To write the odd bytes the device 200 must invert the odd bytes to create data and data bar pairs as the second format.

As indicated above, FIGS. 6 and 7A-7C are provided as an example. Other examples may differ from what is described with regard to FIGS. 6 and 7A-7C.

Figure 8:
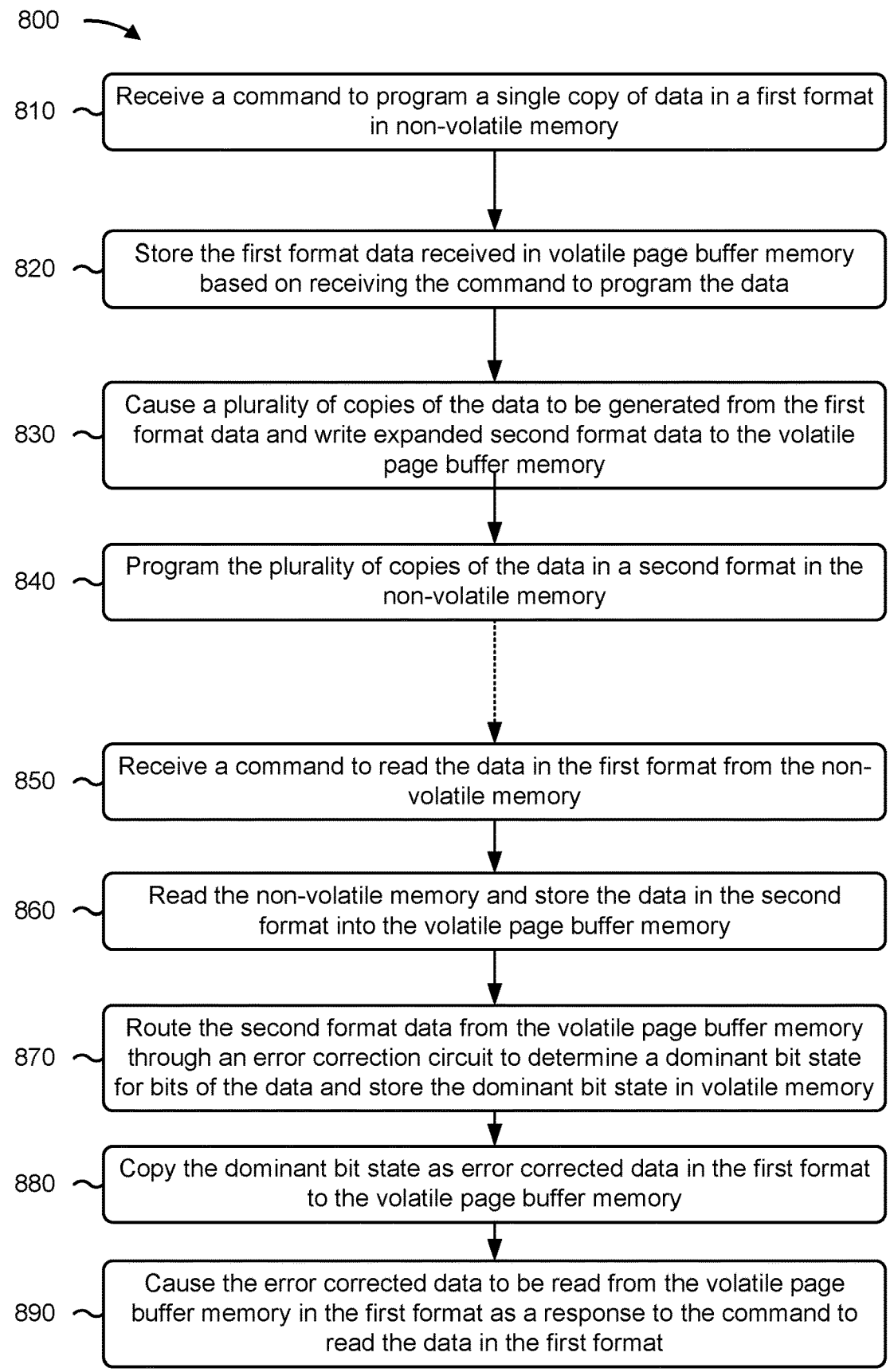
FIG. 8 is a diagram of an example process for bit error management.

FIG. 8 is a flowchart of an example method 800 associated with bit error management in memory devices. In some implementations, a memory device (e.g., the memory device 140 and/or the device 200) may perform or may be configured to perform one or more process blocks of FIG. 8. In some implementations, another device or a group of devices separate from or including the memory device may perform or may be configured to perform one or more process blocks of FIG. 8. Additionally, or alternatively, one or more components of the memory device (e.g., the interface 210, the memory plane 220, the error corrected block 230, the controller 240, the volatile memory 250, and/or the data path 260) may perform or may be configured to perform one or more process blocks of FIG. 8.

As shown in FIG. 8, in a first period of time, the method 800 may include receiving a command to program a single copy of data in a first format in non-volatile memory (block 810). As further shown in FIG. 8, the method 800 may include storing the first format data received in volatile page buffer memory based on receiving the command to program the data (block 820). As further shown in FIG. 8, the method 800 may include causing a plurality of copies of the data to be generated from the first format data and writing the expanded second format data to the volatile page buffer memory (block 830). As further shown in FIG. 8, the method 800 may include programming the plurality of copies of the data in the second format in the non-volatile memory (block 840).

As shown in FIG. 8, in a second period of time after the first period of time associated with blocks 810-840, the method 800 may receiving a command to read the data in the first format from the non-volatile memory (block 850). As further shown in FIG. 8, the method 800 may include reading the non-volatile memory and storing the data in the second format in the volatile page buffer memory (block 860). As further shown in FIG. 8, the method 800 may include routing the second format data from the volatile page buffer memory through an error correction circuit to determine a dominant bit state for bits fo the data and storing the dominant bit state in volatile memory (block 870). As further shown in FIG. 8, the method 800 may include copying the dominant bit state as error corrected data in the first format to the volatile page buffer memory (block 880). As further shown in FIG. 8, the method 800 may include causing the error corrected data to be read from the volatile page buffer memory in the first format as a response to the command to read the data in the first format (block 890).

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein, such as the operations described in connection with FIGS. 4A-7C.

Figure 9:
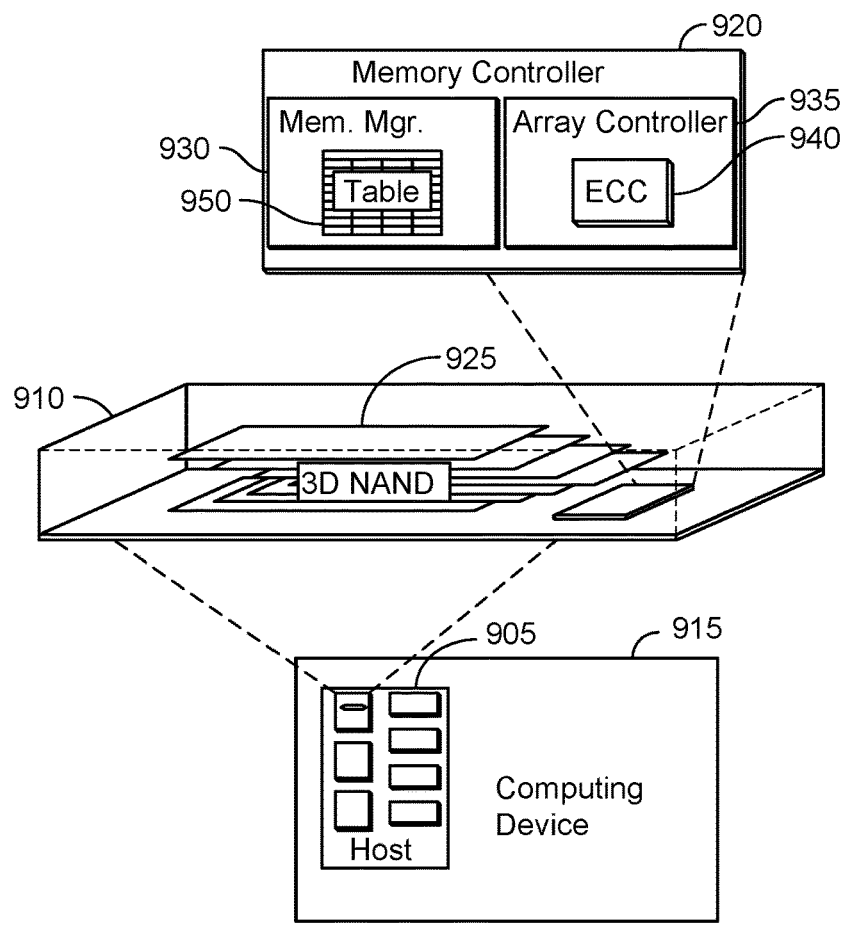
FIG. 9 is a diagram illustrating an example environment that includes a memory device.

FIG. 9 is a diagram illustrating an example environment 900 that includes a memory device. As shown in FIG. 9, the environment 900 includes a host device 905 and a memory device 910 configured to communicate via a communication interface. The host device 905 and/or the memory device 910 may be included in a computing device 915, such as a computer, a server, and/or an Internet of Things (IoT) device. For example, the memory device 910 may be a discrete memory component of the host device 905. Alternatively, the memory device 910 may be a portion of an integrated circuit that is included with one or more other components of the host device 905. In some implementations, the host device 905 may be the host device 110 of FIG. 1, and/or the memory device 910 may be the memory device 140 and/or the device 200.

The memory device 910 may include a memory controller 920, which may be the controller 240. Additionally, or alternatively, the memory device 910 may include a memory array 925. The memory array 925 may include one or more memory dies. The memory array 925 is shown as a three-dimensional (3D) NAND array. In 3D array semiconductor memory technology, memory structures are stacked vertically, which increases the quantity of memory cells that can fit in a given die size. Although the memory array 925 is shown as a 3D array, in some implementations, the memory array 925 is a two-dimensional (2D) array.

The host device 905 and/or the memory device 910 may include one or more communication interfaces configured to transfer data between the memory device 910 and one or more components of the host device 905. For example, the host device 905 and/or the memory device 910 may include a Serial Advanced Technology Attachment (SATA) interface, a Peripheral Component Interconnect Express (PCIe) interface, a USB interface, a Universal Flash Storage (UFS) interface, and/or an embedded multimedia card (eMMC) interface.

The memory controller 920 may include, for example, one or more processors, a microcontroller, an ASIC, and/or an FPGA. In some implementations, a non-transitory computer-readable medium (e.g., volatile memory and/or non-volatile memory) may store a set of instructions (e.g., one or more instructions or code) for execution by the memory controller 920. The memory controller 920 may execute the set of instructions to perform one or more operations or methods described herein. In some implementations, execution of the set of instructions, by the memory controller 920, causes the memory controller 920 and/or the memory device 910 to perform one or more operations or methods described herein. In some implementations, hardwired circuitry is used instead of or in combination with the instructions to perform one or more operations or methods described herein. Additionally, or alternatively, the memory controller 920 and/or one or more components of the memory device 910 may be configured to perform one or more operations or methods described herein.

The memory controller 920 may receive one or more instructions from the host device 905 and may communicate with the memory array based on the one or more instructions, such as to transfer data to (e.g., write or program), to transfer data from (e.g., read), and/or to erase a portion of the memory array 925 (e.g., one or more memory cells, pages, sub-blocks, blocks, or planes of the memory array 925). Additionally, or alternatively, the memory controller 920 may include one or more components configured to control access to the memory array 925 and/or to provide a translation layer between the host device 905 and the memory device 910 for access to the memory array 925. The memory controller 920 may include one or more input/output (I/O) circuits, lines, or interfaces to transfer data to or from the memory array 925. In some implementations, the memory controller 920 may include a memory manager 930 and/or an array controller 935.

The memory manager 930 may include one or more components (e.g., circuitry) configured to perform one or more memory management functions, such as wear leveling, error detection, error correction, block retirement, or one or more other memory management functions. The memory manager 930 may parse or format a host command (e.g., a command received from the host device 905) into a memory command (e.g., a command for performing an operation on the memory array 925). Additionally, or alternatively, the memory manager 930 may generate one or more memory commands based on one or more instructions received from the array controller 935 and/or one or more other components of the memory device 910.

The memory manager 930 may include or may operate using one or more memory management tables 950 configured to store information associated with the memory array 925. For example, a memory management table 950 may include information regarding block age, block erase count, error history, or one or more error counts associated with one or more blocks of memory cells included in the memory array 925.

The array controller 935 may include one or more components (e.g., circuitry) configured to control one or more memory operations associated with writing data to, reading data from, or erasing one or more memory cells of the memory array 925. The one or more memory operations may be based on, for example, a host command received from the host device 905 or a command generated internally by the memory device 910 (e.g., in association with wear leveling, error detection, and/or error correction). In some implementations, the array controller 935 may include an error correction code (ECC) component 940. The ECC component 940 may include one or more components configured to detect or correct errors associated with writing data to or reading data from one or more memory cells of the memory array 925. For example, the ECC component 940 may correspond to the error correction circuit of the data path 260 of the device 200. Additionally, or alternatively, the ECC component 940 may include one or more other components associated with performing error correction.

One or more devices or components shown in FIG. 9 may be used to carry out operations described elsewhere herein, such as one or more operations of FIGS. 4A-7C and/or one or more process blocks of the method of FIG. 8.

As indicated above, FIG. 9 is provided as an example. Other examples may differ from what is described with regard to FIG. 9.

Figure 10:
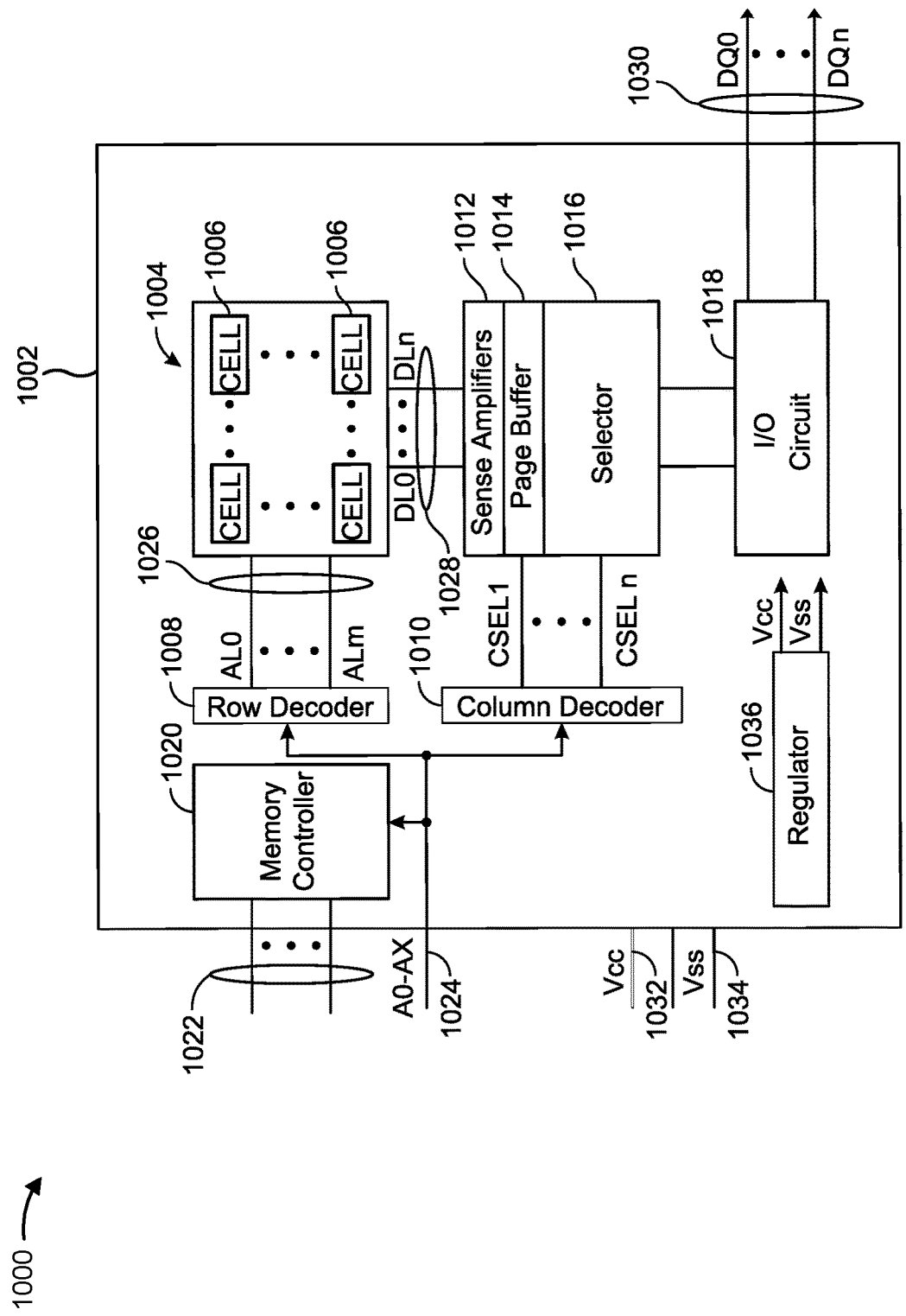
FIG. 10 is a diagram illustrating an example of components included in a memory device.

FIG. 10 is a diagram illustrating an example 1000 of components included in a memory device 1002. The memory device 1002 may be the memory device 140 and/or the device 200. The memory device 1002 may include a memory array 1004 having multiple memory cells 1006. The memory device 1002 may include one or more components (e.g., circuits) to transmit signals to or perform memory operations on the memory array 1004. For example, the memory device 1002 may include a row decoder 1008, a column decoder 1010, one or more sense amplifiers 1012, a page buffer 1014, a selector 1016, an input/output (I/O) circuit 1018, and a memory controller 1020. The memory controller 1020 may be the controller 240.

The memory controller 1020 may control memory operations of the memory device 1002 according to one or more signals received via one or more control lines 1022, such as one or more clock signals or control signals that indicate an operation (e.g., write, read, or erase) to be performed. Additionally, or alternatively, the memory controller 1020 may determine one or memory cells 1006 upon which the operation is to be performed based on one or more signals received via one or more address lines 1024, such as one or more address signals (shown as A0-AX). A host device external from the memory device 1002 may control the values of the control signals on the control lines 1022 and/or the address signals on the address line 1024.

The memory device 1002 may use access lines 1026 (sometimes called word lines or row lines, and shown as AL0-ALm) and data lines 1028 (sometimes called digit lines, bit lines, or column lines, and shown as DL0-DLn) to transfer data to or from one or more of the memory cells 1006. For example, the row decoder 1008 and the column decoder 1010 may receive and decode the address signals (A0-AX) from the address line 1024 and may determine which of the memory cells 1006 are to be accessed based on the address signals. The row decoder 1008 and the column decoder 1010 may provide signals to those memory cells 1006 via one or more access lines 1026 and one or more data lines 1028, respectively.

For example, the column decoder 1010 may receive and decode address signals into one or more column select signals (shown as CSEL1-CSELn). The selector 1016 may receive the column select signals and may select data in the page buffer 1014 that represents values of data to be read from or to be programmed into memory cells 1006. The page buffer 1014 may be configured to store data received from a host device before the data is programmed into relevant portions of the memory array 1004, or the page buffer 1014 may store data read from the memory array 1004 before the data is transmitted to the host device. The sense amplifiers 1012 may be configured to determine the values to be read from or written to the memory cells 1006 using the data lines 1028. For example, in a selected string of memory cells 1006, a sense amplifier 1012 may read a logic level in a memory cell 1006 in response to a read current flowing through the selected string to a data line 1028. The I/O circuit 1018 may transfer values of data in or out of the memory device 1002 (e.g., to or from a host device), such as in or out of the page buffer 1014 or the memory array 1004, using I/O lines 1030 (shown as (DQ0-DQN)).

The memory controller 1020 may receive positive and negative supply signals, such as a supply voltage (Vcc) 1032 and a negative supply (Vss) 1034 (e.g., a ground potential), from an external source or power supply (e.g., an internal battery, an external battery, and/or an AC-to-DC converter). In some implementations, the memory controller 1020 may include a regulator 1036 to internally provide positive or negative supply signals.

One or more devices or components shown in FIG. 10 may be used to carry out operations described elsewhere herein, such as one or more operations of FIGS. 4A-7C and/or one or more process blocks of the method of FIG. 8.

As indicated above, FIG. 10 is provided as an example. Other examples may differ from what is described with regard to FIG. 10.

Figure 11:
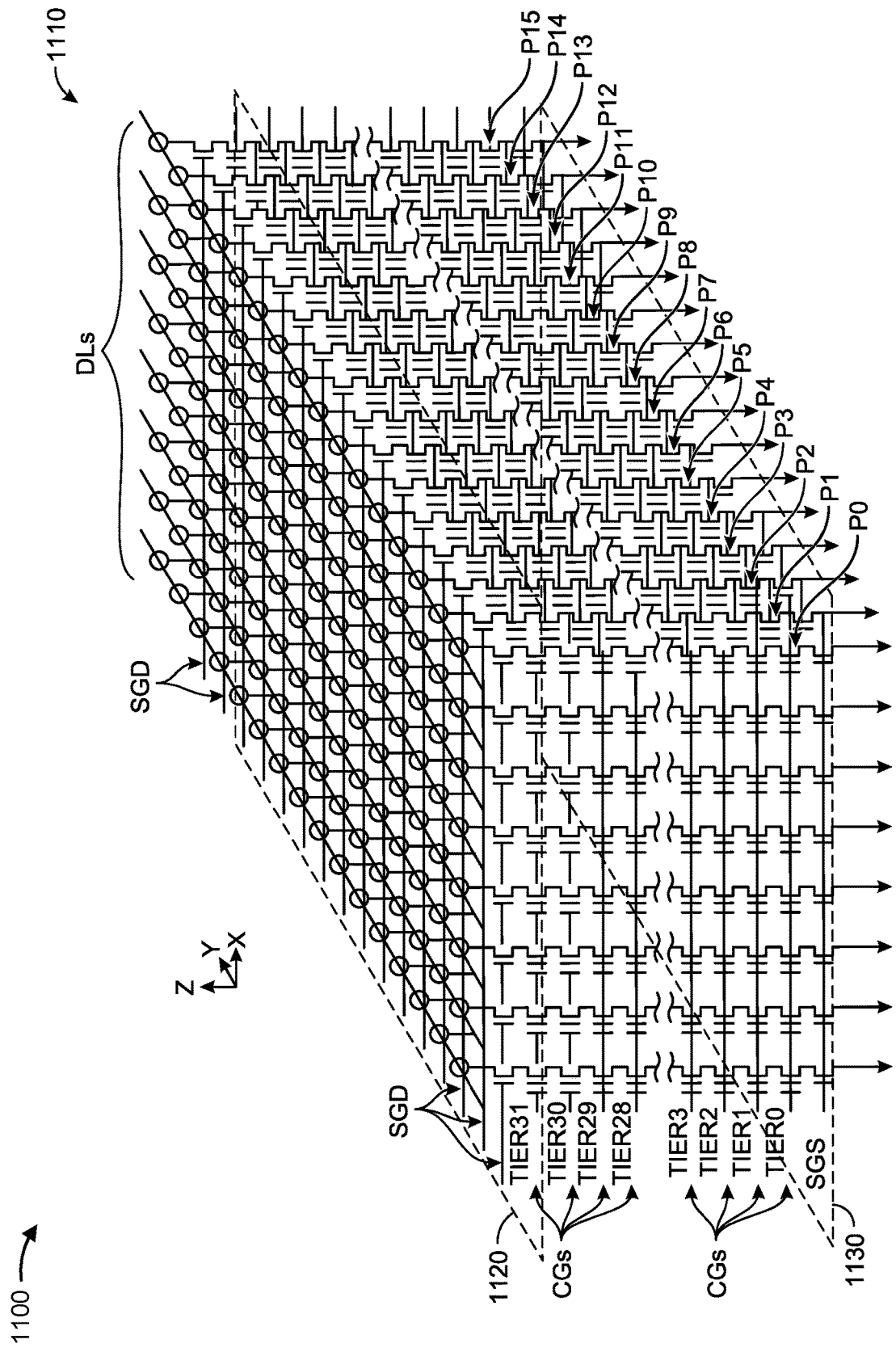
FIG. 11 is a diagram illustrating an example of a memory array.

FIG. 11 is a diagram illustrating an example 1100 of a memory array 1110. Although FIG. 11 shows a 3D NAND memory array, some implementations described herein may be performed in connection with another type of memory array, such as a 2D memory array.

The memory array 1110 includes multiple strings of memory cells, and each string including 32 tiers (shown as TIER0-TIER31) of charge storage transistors stacked in the Z direction, source to drain, from a source-side select gate (SGS) to a drain-side select gate (SGD). Each string of memory cells in the memory array 1110 may be arranged along the Y direction as data lines (shown as DLs), and along the X direction as pages (shown as P0-P15). Within a page, each tier represents a row of memory cells, and each string of memory cells represents a column. A block of memory cells may include a number of pages (e.g., 128 or 384). In other examples, each string of memory cells may include a different number of tiers (e.g., 8, 16, 64, or 128), and/or one or more additional tiers of semiconductor material above or below the charge storage transistors (e.g., to form select gates or data lines).

Each memory cell in the memory array 1110 includes a control gate coupled to (e.g., electrically or otherwise operatively connected to) an access line, which collectively couples the control gates across a specific tier or a portion of a tier. Specific tiers in the 3D memory array, and accordingly, specific memory cells in a string, may be accessed or controlled using respective access lines. For example, the memory array 1110 includes a first level of semiconductor material 1120 (e.g., silicon material, such as polysilicon) that couples the control gates of each memory cell in TIER31, and a second level of semiconductor material 1130 that couples the SGS of the array. Similar levels of metal or semiconductor material may couple the control gates for each tier. Specific strings of memory cells in the array may be accessed, selected, or controlled using a combination of data lines (DLs) and select gates, and specific memory cells at one or more tiers in the specific strings may be accessed, selected, or controlled using one or more access lines. In some implementations, the memory device 140, the device 200, the memory device 910, and/or the memory device 1002 may include the memory array 1110 of FIG. 11. For example, the memory array 925 and/or the memory array 1004 may be the memory array 1110.

As indicated above, FIG. 11 is provided as an example. Other examples may differ from what is described with regard to FIG. 11.

In some implementations, a memory device includes a volatile memory; a non-volatile memory; and a controller configured to: receive a command to program data provided in a first format in the volatile cache memory; write the data to a secondary volatile memory; expand the data from the secondary data cache of the volatile memory to provide a plurality of copies of the data in the volatile memory to the secondary data cache of the non-volatile memory, the plurality of copies comprising a second format of the data; and program the plurality of copies of the data in the second format from the secondary data cache of the non-volatile memory to an array of the non-volatile memory.

In some implementations, a memory device includes a volatile memory; a non-volatile memory; and a controller configured to: receive a command to read data in a first format from the non-volatile memory, the data being stored in a second format in the non-volatile memory, the second format comprising a plurality of copies of the data in the first format; provide the plurality of copies of the data from the non-volatile memory to an error correction circuit; compare, using the error correction circuit, the plurality of copies of the data to determine a dominant bit state for bits of the data; store the dominant bit state for the bits of the data in the volatile memory as corrected data in the first format; provide the corrected data from the volatile memory to the page buffer volatile memory in the first format as a response to the command to read the data in the first format.

In some implementations, a method includes receiving, by a memory device, a command to read data in a first format from non-volatile memory, the data being stored in a second format in the non-volatile memory, the second format comprising a plurality of copies of the data in the first format; comparing, by the memory device and using an error correction circuit, the plurality of copies of the data to determine a dominant bit state for bits of the data; storing, by the memory device, the dominant bit state for bits of the data in the non-volatile memory as error-corrected data in the first format; and causing, by the memory device, the error-corrected data to be read from the volatile memory in the first format as a response to the command to read the data in the first format.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   a volatile memory;
   a non-volatile memory; and
   a controller configured to:
      receive a command to read data in a first format from the non-volatile memory, the data being stored in a second format in the non-volatile memory, the second format comprising a plurality of copies of the data in the first format;

provide the plurality of copies of the data from the non-volatile memory to an error correction circuit;
compare, using the error correction circuit, the plurality of copies of the data to determine a dominant bit state for bits of the data;
store the dominant bit state for the bits of the data in the volatile memory as corrected data in the first format;
provide the corrected data from the volatile memory to the non-volatile memory; and
cause the corrected data to be read from the non-volatile memory in the first format as a response to the command to read the data in the first format.

2. The memory device of claim 1, wherein the command to read the data is an Open NAND Flash Interface (ONFI) read command.

3. The memory device of claim 1, wherein the error correction circuit comprises a plurality of adder circuits.

4. The memory device of claim 3, wherein the controller, when configured to compare the plurality of copies of the data to determine the dominant bit state, is configured to:
identify a multi-bit output of the plurality of adder circuits; and
determine the dominant bit state based on a subset of bits of the multi-bit output.

5. The memory device of claim 4, wherein the subset of bits comprises a set of most significant bits (MSBs), and
wherein the controller, when configured to compare the plurality of copies of the data to determine the dominant bit state, is configured to:
compare a first MSB, of the set of MSBs, with a second MSB, of the set of MSBs, to determine the dominant bit state.

6. The memory device of claim 1, wherein the error correction circuit comprises at least one inverter.

7. The memory device of claim 6, wherein the controller, when configured to compare the plurality of copies of the data to determine the dominant bit state, is configured to:
identify a multi-bit output of the error correction circuit with the inverter;
determine an erase error in the plurality of copies of the data based on the multi-bit output of the error correction circuit with the at least one inverter; and
output information identifying the erase error.

8. The memory device of claim 1, wherein the error correction circuit is configured to:
read the plurality of copies of the data from a single NAND column across multiple pages.

9. The memory device of claim 1, wherein the error correction circuit is disposed in a page buffer associated with the non-volatile memory or associated with a data path associated with the non-volatile memory.

10. A memory device, comprising:
a volatile memory;
a non-volatile memory; and
a controller configured to:
receive a command to program data in a first format in the non-volatile memory;
write the data to a secondary data cache of the non-volatile memory based on receiving the command to program the data in the non-volatile memory;
provide the data from the secondary data cache of the non-volatile memory to the volatile memory;
provide a plurality of copies of the data in the volatile memory to the secondary data cache of the non-volatile memory, the plurality of copies comprising a second format of the data; and
program the plurality of copies of the data in the second format from the secondary data cache of the non-volatile memory to a single array of the non-volatile memory.

11. The memory device of claim 10, wherein the command to program the data identifies a first range of addresses, and
wherein the plurality of copies of the data is programmed in a second range of addresses that includes the first range of addresses.

12. The memory device of claim 11, wherein the first range of addresses represents a portion of a single page of the volatile memory, and
wherein the second range of addresses represents an entirety of the single page of the non-volatile memory.

13. The memory device of claim 10, wherein a first copy of the data and a second copy of the data are mirrored across a plurality of pages of the non-volatile memory.

14. The memory device of claim 10, wherein the command to program the data is an Open NAND Flash Interface (ONFI) write command.

15. The memory device of claim 10, wherein a first copy of the data and a second copy of the data are mirrored across one of:
a common write-line across different blocks,
different write-lines across a common block, or
different write-lines across different blocks.

16. The memory device of claim 10, wherein the data is associated with a security operation for chip initialization of the memory device.

17. The memory device of claim 10, wherein a quantity of copies of the data is 8 copies of the data or 16 copies of the data.

18. The memory device of claim 10, wherein a quantity of copies of the data is greater than 3 copies of the data.

19. A method, comprising:
receiving, by a memory device, a command to read data in a first format from non-volatile memory, the data being stored in a second format in the non-volatile memory, the second format comprising a plurality of copies of the data in the first format;
comparing, by the memory device and using an error correction circuit, the plurality of copies of the data to determine a dominant bit state for bits of the data;
storing, by the memory device, the dominant bit state for bits of the data in the non-volatile memory as error-corrected data in the first format; and
causing, by the memory device, the error-corrected data to be read from the non-volatile memory in the first format as a response to the command to read the data in the first format.

20. The method of claim 19, further comprising:
receiving another command to program a single copy of the data in the first format in the non-volatile memory;
storing the single copy of the data to volatile memory based on receiving the other command to program the data;
causing the plurality of copies of the data to be copied from the single copy of the data in the volatile memory to a data cache of the non-volatile memory, the plurality of copies comprising the second format of the data; and
programming the plurality of copies of the data in the second format from the data cache to an array in the non-volatile memory.

21. The method of claim 19, further comprising:
inverting a first subset of the plurality of copies of the data such that the first subset has opposite bit values relative to a second subset of the plurality of copies of the data; and
wherein comparing the plurality of copies of the data comprises:
comparing the plurality of copies of the data based on inverting the first subset of the plurality of copies of the data.

22. The method of claim 19, wherein receiving the command to read the data comprises:
receiving the command to receive the data before system firmware of a system, which includes the memory device, is loaded.

23. The method of claim 19, wherein the first format is associated with a first range of addresses in an array of the non-volatile memory and the second format is associated with a second range of addresses in the array of the non-volatile memory.

24. The method of claim 23, wherein the second range of addresses includes the first range of addresses.

25. The method of claim 23, wherein the first range of addresses is a portion of a page of the array and the second range of addresses is an entirety of the page of the array.

* * * * *